(12) United States Patent
Li

(10) Patent No.: US 11,418,702 B2
(45) Date of Patent: Aug. 16, 2022

(54) METHOD AND DEVICE FOR DISPLAYING SHOOTING INTERFACE, AND TERMINAL

(71) Applicant: GUANGDONG OPPO MOBILE TELECOMMUNICATIONS CORP., LTD., Guangdong (CN)

(72) Inventor: Hui Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 191 days.

(21) Appl. No.: 16/804,209

(22) Filed: Feb. 28, 2020

(65) Prior Publication Data

US 2020/0204725 A1 Jun. 25, 2020

Related U.S. Application Data

(63) Continuation of application No. PCT/CN2017/100590, filed on Sep. 5, 2017.

(51) Int. Cl.
*H04N 5/232* (2006.01)
*H04M 1/02* (2006.01)
(Continued)

(52) U.S. Cl.
CPC ...... *H04N 5/23216* (2013.01); *H04M 1/0264* (2013.01); *H04N 5/232939* (2018.08); *H04M 2250/52* (2013.01); *H04N 5/232935* (2018.08)

(58) Field of Classification Search
CPC ......... H04N 5/23293; H04N 5/232933; H04N 5/232941; H04N 5/23216;
(Continued)

(56) References Cited

U.S. PATENT DOCUMENTS 8,913,170 B1* 12/2014 Baldwin ............... G06F 1/1686
348/333.01
9,057,931 B1* 6/2015 Baldwin .......... H04N 5/232945
(Continued)

FOREIGN PATENT DOCUMENTS

CN 104618652 A 5/2015
CN 104967773 A 10/2015
(Continued)

OTHER PUBLICATIONS

International search report issued in corresponding international application No. PCT/CN2017/100590 dated Mar. 28, 2018.
(Continued)

*Primary Examiner* — Albert H Cutler
(74) *Attorney, Agent, or Firm* — Young Basile Hanlon & MacFarlane, P.C.

(57) ABSTRACT

The implementations of the present disclosure provide a method for displaying a shooting interface, which is applied to a terminal in which an image acquisition component is integrated into a touch screen. The method includes: receiving a first operation signal, where the first operation signal is a signal configured to enable the image acquisition component to perform shooting; enabling the image acquisition component according to the first operation signal; and displaying a shooting interface on the touch screen, where the shooting interface is provided with a component location information which is a prompt information configured to indicate the location of the image acquisition component. The present disclosure also provides a device for displaying a shooting interface, and the terminal.

17 Claims, 13 Drawing Sheets

(51) Int. Cl.
*H04M 1/72403* (2021.01)
*H04M 1/725* (2021.01)

(58) Field of Classification Search
CPC ....... H04N 5/232939; H04N 5/232935; H04N 5/232; H04M 1/0264; H04M 2250/52; H04M 1/72403; H04M 1/725
See application file for complete search history.

(56) References Cited

U.S. PATENT DOCUMENTS

| | | | |
|---|---|---|---|
| 9,344,673 B1* | 5/2016 | Buchheit | H04N 5/23218 |
| 2004/0016814 A1* | 1/2004 | Muramatsu | H04N 1/00326 235/462.41 |
| 2004/0212555 A1* | 10/2004 | Falco | H04M 1/0277 345/50 |
| 2008/0225109 A1* | 9/2008 | Lee | H04N 7/144 348/14.02 |
| 2013/0143604 A1* | 6/2013 | Kashimoto | H04M 1/72412 455/457 |
| 2014/0063049 A1 | 3/2014 | Armstrong-Muntner | |
| 2015/0091794 A1* | 4/2015 | Ha | G06F 3/013 345/156 |
| 2016/0191790 A1 | 6/2016 | Wang et al. | |
| 2016/0323503 A1* | 11/2016 | Wada | H04M 1/72403 |
| 2017/0180615 A1* | 6/2017 | Lautenbach | H04N 5/2258 |
| 2017/0180637 A1* | 6/2017 | Lautenbach | H04N 5/23222 |
| 2018/0295287 A1* | 10/2018 | Li | H04N 5/23293 |

FOREIGN PATENT DOCUMENTS

| | | |
|---|---|---|
| CN | 105094307 A | 11/2015 |
| CN | 105959544 A | 9/2016 |
| WO | 2016191938 A1 | 12/2016 |

OTHER PUBLICATIONS

Extended European search report issued in corresponding European application No. 17924308.4 dated Jul. 9, 2020.

* cited by examiner

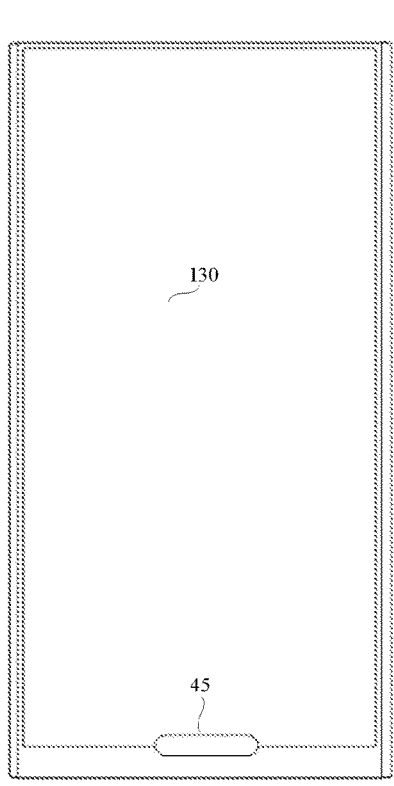
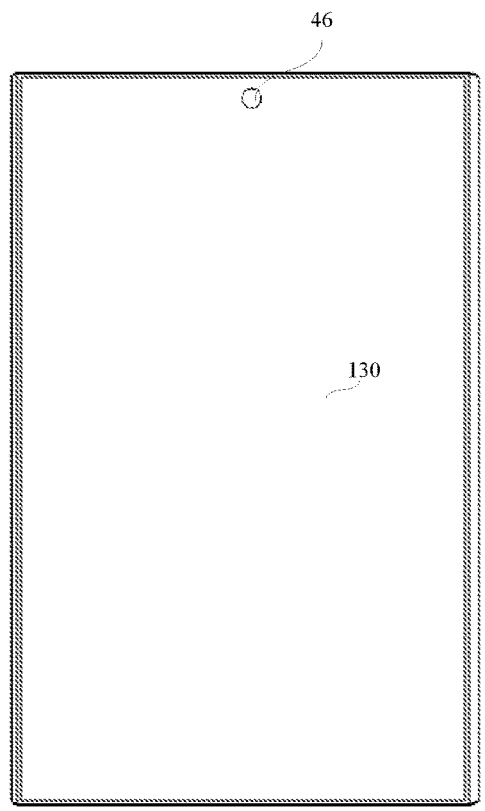

FIG. 7   FIG. 8

| Receiving a first operation signal, where the first operation signal is a signal configured to enable an image acquisition component to perform shooting | ~401 |
|---|---|
| Enabling the image acquisition component according to the first operation signal | ~402 |
| Displaying a shooting interface on a touch screen, the shooting interface being provided with a component location information, wherein the component location information is a prompt information configured to indicate a location of the image acquisition component | ~403 |

FIG. 9

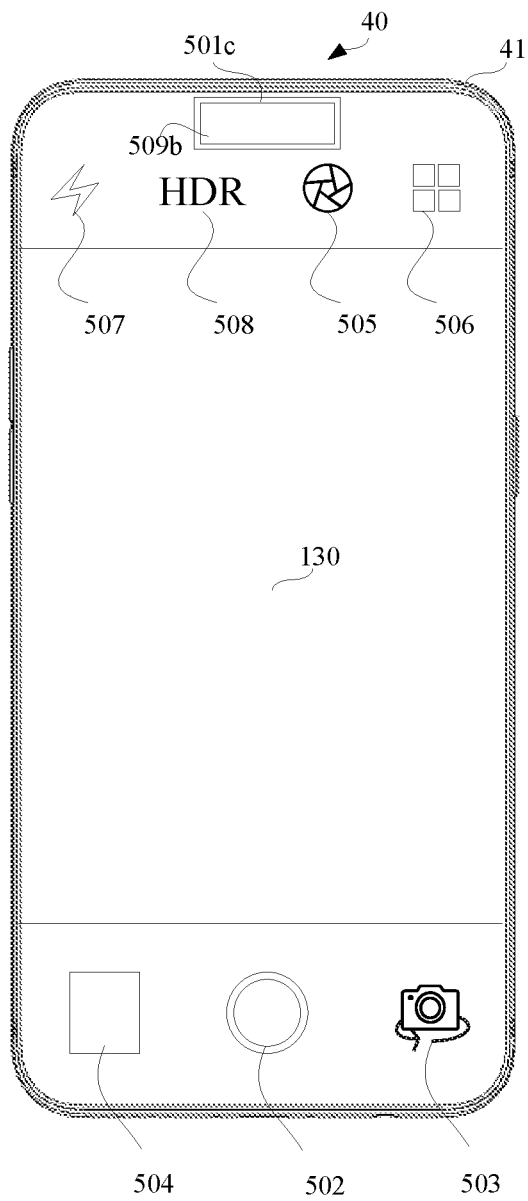
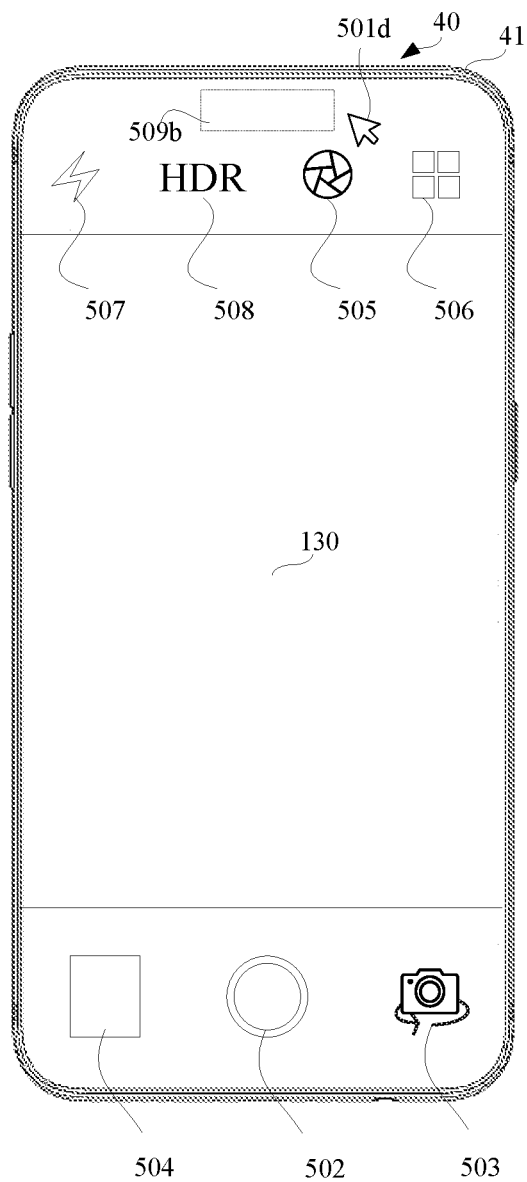
FIG. 12  FIG. 13

METHOD AND DEVICE FOR DISPLAYING SHOOTING INTERFACE, AND TERMINAL

CROSS-REFERENCE TO RELATED APPLICATION(S)

This application is a continuation application of International Application No. PCT/CN2017/100590, filed on Sep. 5, 2017, the entire disclosure of which is hereby incorporated by reference in its entirety.

TECHNICAL FIELD

The present disclosure relates to the field of human-computer interaction, and more particularly to a method and a device for displaying a shooting interface, and a terminal.

BACKGROUND

Due to an increasing proportion of a touch screen of a terminal in a front panel of the terminal, the terminal may adopt a design of integrating an image acquisition component into the touch screen.

There are two possible integration ways to integrate the image acquisition component into the touch screen. One is defining a small circular hole in a top area or a bottom area of the touch screen, and integrating the image acquisition component in a cavity formed by the small circular hole. The other is dividing a photosensitive element in the image acquisition component into a plurality of photosensitive pixels, and each photosensitive pixel is integrated into a black area of each display pixel in all or part of the display area of the touch screen, so that the image acquisition component and the touch screen are completely integrated into one body.

However, when the image acquisition component is integrated into the touch screen, the image acquisition component and the touch screen will be integrated into one body on vision, which makes it difficult for a user to identify the location of the image acquisition component when the terminal is in a front shooting mode, and thus provides a poor use experience for the user.

SUMMARY

Implementations of the present disclosure provide a method and a device for displaying a shooting interface, and a terminal.

According to a first aspect of the present disclosure, a method for displaying a shooting interface is provided. The method is applied to a terminal in which an image acquisition component is integrated into a touch screen of the terminal. The method includes the followings. A first operation signal is received, where the first operation signal is a signal configured to enable the image acquisition component to perform shooting. The image acquisition component is enabled according to the first operation signal. A shooting interface is displayed on the touch screen, where the shooting interface is provided with a component location information which is a prompt information configured to indicate a location of the image acquisition component.

According to a second aspect of the present disclosure, a device for displaying a shooting interface is provided. The device is applied to a terminal in which an image acquisition component is integrated into a touch screen of the terminal. The device includes the followings. A receiving module is configured to receive a first operation signal, where the first operation signal is a signal configured to enable the image acquisition component to perform shooting. A control module is configured to enable the image acquisition component according to the first operation signal. A display module is configured to display a shooting interface on the touch screen, where the shooting interface is provided with a component location information which is a prompt information configured to indicate a location of the image acquisition component.

According to a third aspect of the present disclosure, a terminal is provided. The terminal includes a processor and a memory. The memory stores at least one instruction which is loaded and executed by the processor to implement the method for displaying a shooting interface according to the first aspect.

According to a fourth aspect of the present disclosure, a non-transitory computer-readable storage medium is provided. The storage medium stores at least one instruction which is loaded and executed by a processor to implement for displaying a shooting interface according to the first aspect.

BRIEF DESCRIPTION OF DRAWINGS

In order to more clearly illustrate technical solutions in the implementations of the present disclosure, the accompanying drawings required for describing the implementations will be briefly described below. It is obvious that the accompanying drawings in the following description only illustrate some implementations of the present disclosure. Those skilled in the art may also obtain other drawings based on these accompanying drawings without paying any creative efforts.

FIG. 7 is a schematic diagram of the appearance of the terminal according to another example implementation of the present disclosure.

FIG. 8 is a schematic diagram of the appearance of the terminal according to another example implementation of the present disclosure.

FIG. 9 is a flowchart of a method for displaying a shooting interface according to an example implementation of the present disclosure.

FIG. 12 is a schematic diagram of a user interface of the shooting application according to an example implementation of the present disclosure.

FIG. 13 is a schematic diagram of a user interface of the shooting application according to an example implementation of the present disclosure.

DETAILED DESCRIPTION

To make objectives, technical solutions, and advantages of the present disclosure clearer, the implementations of the present disclosure will be described in further detail below with reference to the accompanying drawings.

The "module" mentioned herein generally refers to a program or instructions stored in a memory capable of implementing certain functions. The "unit" mentioned herein generally refers to a functional structure divided logically, and the "unit" can be implemented by hardware or a combination of software and hardware.

The "plurality"/"multiple" mentioned herein refer to two or more. The "and/or" describes an association relationship between related objects and indicates that there can be three kinds of relationships. For example, "A and/or B" can indicate that there are three cases: A exists alone, A and B exist at the same time, and B exists alone. The character "/" generally indicates an "or" relationship between related objects.

Figure 1:
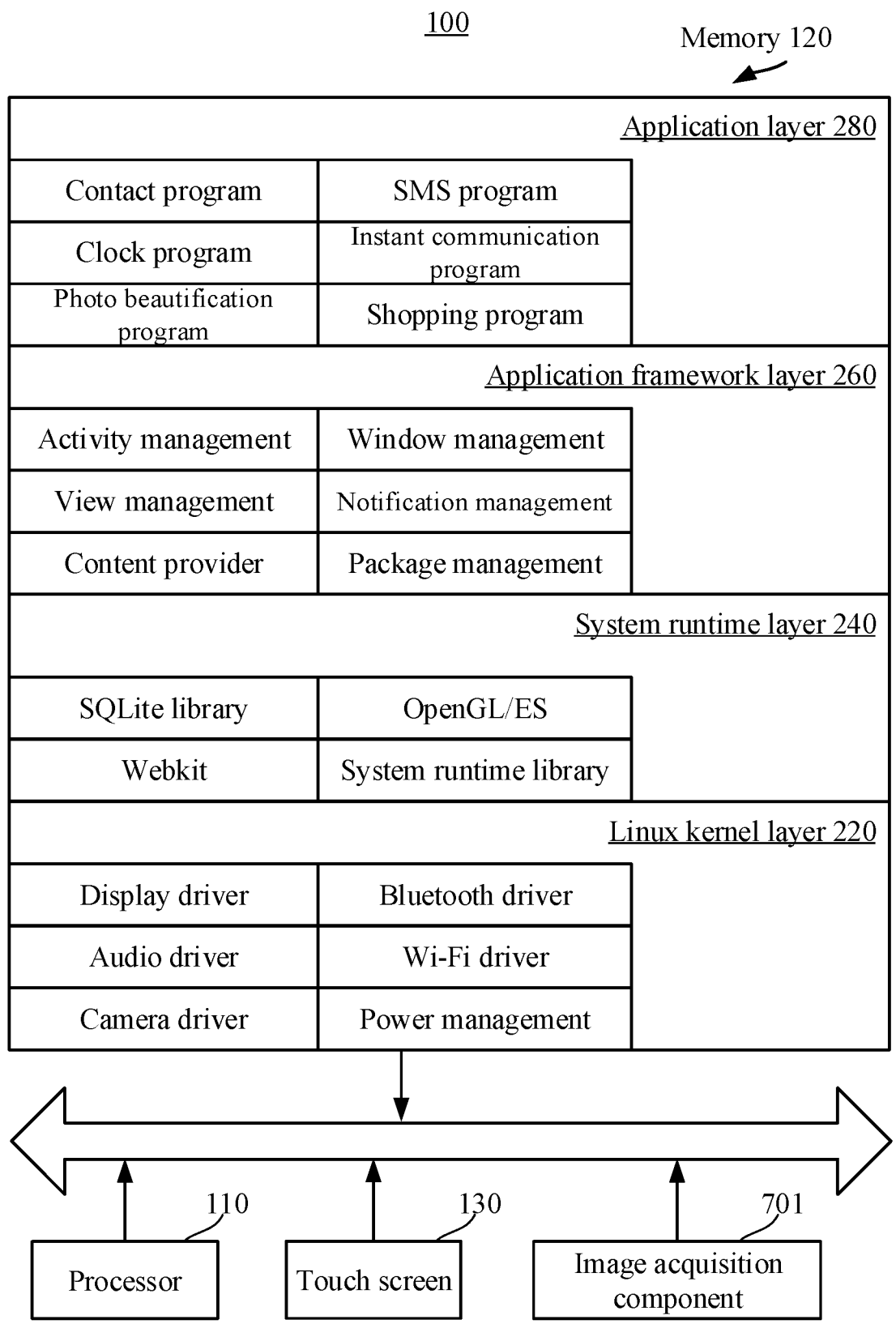
FIG. 1 is a structural block diagram of a terminal according to an example implementation of the present disclosure.
Figure 2:
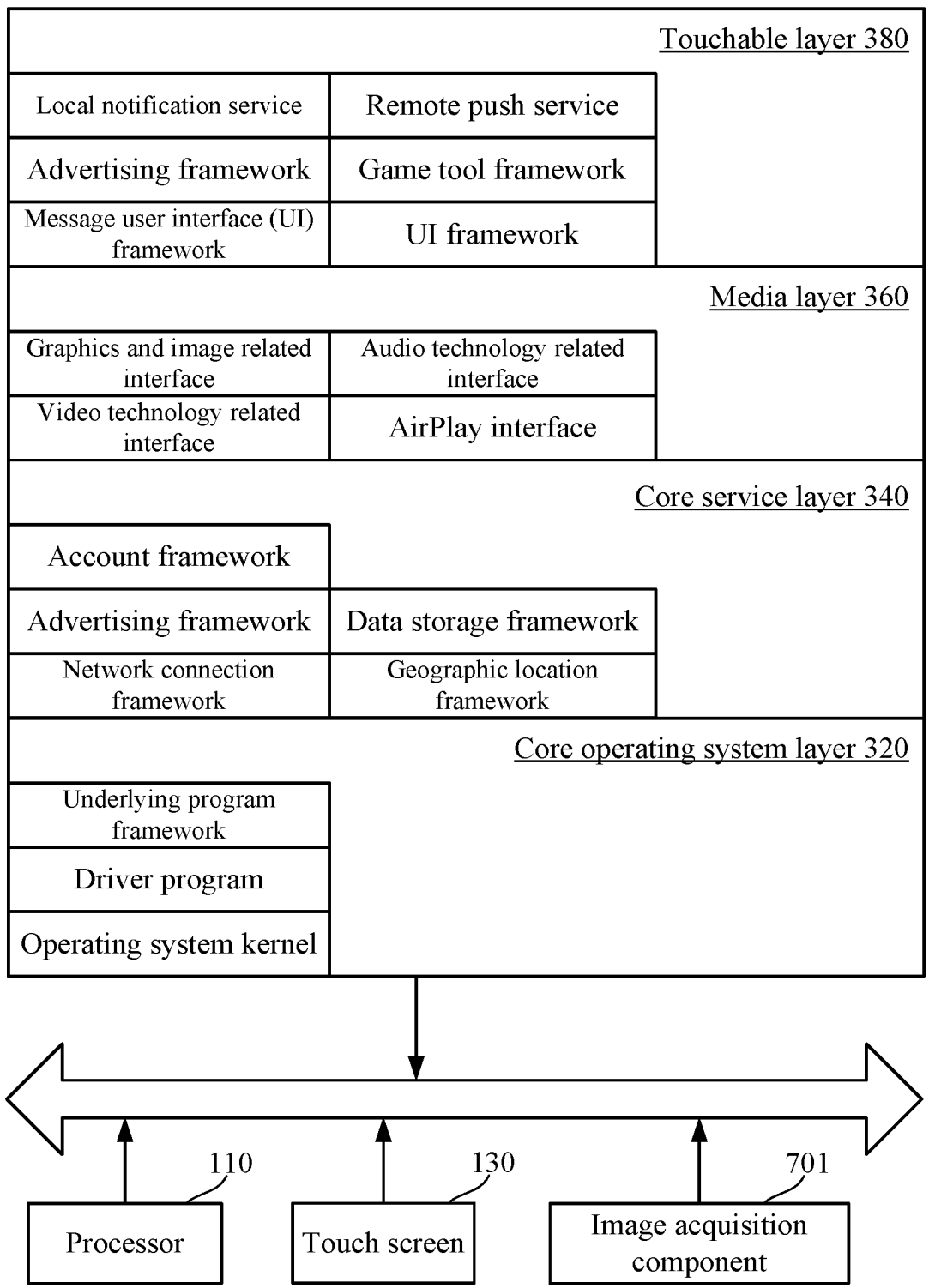
FIG. 2 is a structural diagram of a terminal according to another example implementation of the present disclosure.

Referring to FIG. 1 and FIG. 2, a structural block diagram of a terminal 100 is illustrated according to an example implementation of the present disclosure. The terminal 100 may be a mobile phone, a tablet computer, a notebook computer, an e-book, or the like. The terminal 100 in the present disclosure may include one or more of the following components: a processor 110, a memory 120, a touch screen 130, and an image acquisition component 701.

The processor 110 may include one or more processing cores. The processor 110 uses various interfaces and lines to connect various parts of the entire terminal 100, and executes various functions and processes data of the terminal 100 by running or executing instructions, programs, code sets or instruction sets stored in the memory 120, and invoking data stored in the memory 120. Alternatively, the processor 110 may be implemented in at least one hardware form of a digital signal processing (DSP), a field-programmable gate array (FPGA), and a programmable logic array (PLA). The processor 110 may integrate one or more combinations of a central processing unit (CPU), a graphics processing unit (GPU), a modem, and the like. Among them, the CPU mainly deals with an operating system, user interfaces, and application programs, etc. The GPU is responsible for rendering and drawing contents required to be displayed by the touch screen 130. The modem is configured to process wireless communication. It can be understood that the modem described above may also be implemented by a single chip without being integrated into the processor 110.

The memory 120 may include a random access memory (RAM), or a read-only memory (ROM). Alternatively, the memory 120 includes a non-transitory computer-readable storage medium. The memory 120 may be used to store instructions, programs, codes, code sets, or instruction sets. The memory 120 may include a program storage area and a data storage area. The program storage area may store instructions for implementing an operating system, instructions for implementing at least one function (such as a touch function, a sound playback function, an image playback function, etc.), instructions for implementing the following method implementations, etc. The data storage area may store data (such as audio data, a phone book, etc.) which are created according to the use of the terminal 100. In the implementation, the memory 120 stores at least one instruction which is used to implement a method for displaying a shooting interface provided in the following method implementation when executed by the processor 110.

Taking an Android® system as an example of the operating system, the programs and data stored in the memory 120 are illustrated in FIG. 1. The memory 120 stores a Linux kernel layer 220, a system runtime layer 240, an application framework layer 260, and an application layer 280. The Linux kernel layer 220 provides underlying drivers for various hardware of the terminal 100, such as a display driver, an audio driver, a camera driver, a Bluetooth® driver, a Wi-Fi® driver, a power management, etc. The system runtime layer 240 provides main feature support for the Android® system through some C/C++ libraries. For example, SQLite library provides database support, OpenGL/ES library provides 3D drawing support, and Webkit library provides browser kernel support, etc. An Android runtime library is also provided in the system runtime library layer 240, which mainly provides some core libraries, allowing developers to use Java language to write Android® applications. The application framework layer 260 provides various application programming interfaces (APIs) that may be used in building application programs. Developers can also use these APIs to build their own application programs, such as activity management, window management, view management, notification management, content providers, package management, call management, resource management, location management, etc. At least one application program is running in the application layer 280. These application programs may be programs provided by the operating system, such as a contact program, a SMS program, a clock program, a camera application, etc., or programs developed by third-party developers, such as an instant communication program, a photo beautification program, etc.

Taking an IOS® system as an example of the operating system, the programs and data stored in the memory 120 are illustrated in FIG. 2. The IOS® system includes a core operating system layer 320 (Core OS layer), a core service layer 340, a media layer 360, and a touchable layer 380 (Cocoa Touch Layer). The core operating system layer 320 includes an operating system kernel, driver programs, and underlying program frameworks. These underlying program frameworks provide functions closer to the hardware for use by program frameworks located in the core service layer

340. The core service layer 340 provides system services and/or program frameworks required by application programs, such as a foundation framework, an account framework, an advertising framework, a data storage framework, a network connection framework, a geographic location framework, a motion framework, and the like. The media layer 360 provides audio-visual-related interfaces for application programs, such as graphics and image related interfaces, audio technology related interfaces, video technology related interfaces, AirPlay interfaces of audio and video transmission technology, and the like. The touchable layer 380 provides various commonly used interface related frameworks for application development. The touchable layer 380 is responsible for the user's touch interaction operations on the terminal 100, such as a local notification service, a remote push service, an advertising framework, a game tool framework, a message user interface (UI) framework, a user interface UIKit framework, a map framework, and the like.

In the frameworks illustrated in FIG. 2, the frameworks related to most applications include, but are not limited to, a basic framework in the core service layer 340 and the UIKit framework in the touchable layer 380. The basic framework provides many basic object classes and data types, to provide the most basic system services for all application programs, regardless of the UI. The classes provided by the UIKit framework are basic UI class libraries for creating touch-based user interfaces. IOS application programs can provide UIs based on the UIKit framework, so it provides the application programs infrastructure for building user interfaces, drawing, handling user interaction events, responding to gestures, and the like.

The touch screen 130 is configured to receive touch operations performed on or near the touch screen 130 by the user using any suitable object such as a finger, a touch pen, etc., and display the user interface of each application program. The touch screen 130 is usually arranged on a front panel of the terminal 130. The touch screen 130 may be designed as a full screen, a curved screen or a special-shaped screen. The touch screen 130 may also be designed as a combination of a full screen and a curved screen, or a combination of a special-shaped screen and a curved screen, which is not limited in this implementation.

Full Screen

Figure 3:
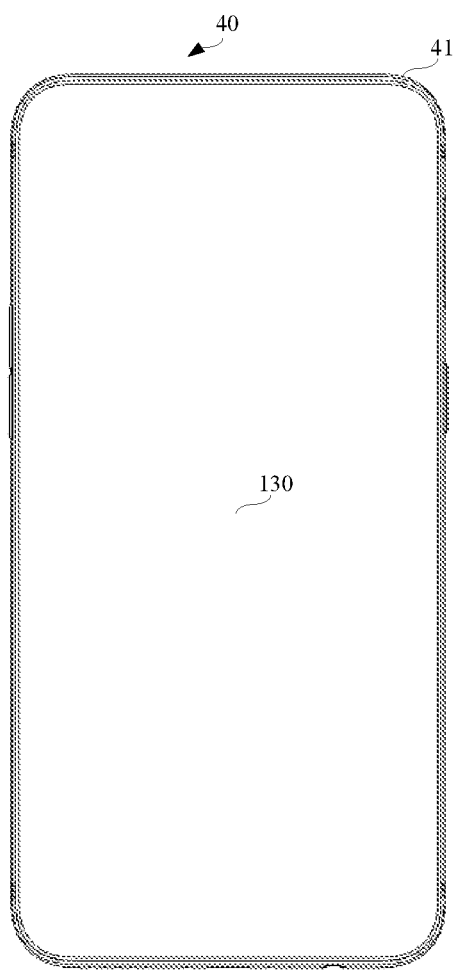
FIG. 3 is a schematic diagram of the appearance of the terminal according to an example implementation of the present disclosure.

The full screen may refer to a screen design in which a screen ratio of the touch screen 130 occupying the front panel of the terminal 100 exceeds a threshold value (such as 80% or 90% or 95%). One calculation method of the screen ratio is: (area of the touch screen 130/area of the front panel of the terminal 100)*100%. Another calculation method of the screen ratio is: (area of actual display area in the touch screen 130)/the area of the front panel of the terminal 100)*100%. Another calculation method of the screen ratio is: (diagonal length of the touch screen 130/diagonal length of the front panel of the terminal 100)*100%. In a schematic example illustrated in FIG. 3, almost all areas on the front panel of the terminal 100 are covered by the touch screens 130. That is, the area on the front panel 40 of the terminal 100 except the edges caused by the middle frame 41 is covered by the touch screen 130. The four corners of the touch screen 130 may be right angles or rounded corners.

The full screen may also refer to a screen design in which at least one front panel component is integrated within or below the touch screen 130. Alternatively, the at least one front panel component includes a camera, a fingerprint sensor, a proximity light sensor, a distance sensor, and the like. In some implementations, other components on the front panel of a conventional terminal are integrated in all or part of the area of the touch screen 130. For example, a photosensitive element in the camera is divided into a plurality of photosensitive pixels, and each photosensitive pixels is integrated into a black area of each display pixel of the touch screen 130. Since the at least one front panel component is integrated inside the touch screen 130, the full screen has a higher screen ratio.

Of course, in other implementations, the front panel components on the front panel of the conventional terminal can also be arranged on a side or a back of the terminal 100. For example, an ultrasonic fingerprint sensor is arranged under the touch screen 130, a bone conduction type earphone is arranged inside the terminal 130, and the camera is arranged at the side of the terminal and is set as a pluggable structure.

In some optional implementations, when the terminal 100 adopts a full screen, a single side, two sides (such as left and right sides), or four sides (such as upper, lower, left, and right sides) of the middle frame of the terminal 100 are provided with edge touch sensors, which are configured to detect at least one kind of operation performed by the user on the middle frame, such as touch operations, click operations, press operations, slide operations, and the like. The edge touch sensor may be any one of a touch sensor, a thermal sensor, a pressure sensor, and the like. The user can apply an operation on the edge touch sensor to control the application programs in the terminal 100.

Curved Screen

Figure 4:
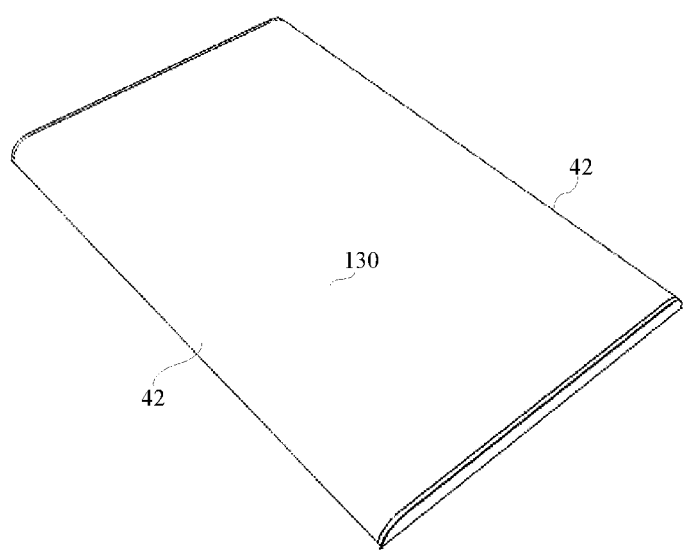
FIG. 4 is a schematic diagram of the appearance of the terminal according to another example implementation of the present disclosure.

The curved screen refers to a screen design in which the screen area of the touch screen 130 is not in a plane. Generally, there is at least one cross section in the curved screen: the cross section has a curved shape, and a projection of the curved screen on any plane perpendicular to the cross section is a plane. The curved shape may be U-shaped. Alternatively, the curved screen refers to a screen design in which at least one side of the touch screen is curved. Alternatively, the curved screen refers to that at least one side of the touch screen 130 extends to cover the middle frame of the terminal 100. Since the side of the touch screen 130 extends to cover the middle frame of the terminal 100, that is, the middle frame which does not have a display function and a touch function is covered as a displayable area and/or an operable area, so that the curved screen has a higher screen ratio. Alternatively, in the example illustrated in FIG. 4, the curved screen refers to a screen design in which the left and right sides 42 of the touch screen 130 are curved; or, the curved screen refers to a screen design in which the upper and lower sides of the touch screen 130 are curved; or, the curved screen refers to a screen design with curved shape on the top, bottom, left, and right sides of the touch screen. In an alternative implementation, the curved screen is made of a touch screen material having flexibility.

Special-Shaped Screen

The special-shaped screen refers to a touch screen with an irregular shape. The irregular shape is not a rectangle or a rounded rectangle. Alternatively, the special-shaped screen refers to a screen design in which protrusions, notches, and/or holes are provided on the touch screen 130 having a rectangular or rounded rectangular shape. Alternatively, the protrusions, the notches and/or the holes can be located at the edge of the touch screen 130, the center of the touch screen, or both of the edge and the center of the touch screen 130. When the protrusions, notches and/or holes are arranged on one edge, they can be arranged at a middle position or both ends of the edge. When the protrusions, notches and/or holes are arranged in the center of the screen, they can be arranged in one or more areas of the screen, such as the upper area, the upper left area, the left area, the lower left area, the lower area, the lower right area, the right area, and the upper right area. When arranged in multiple areas, the protrusions, notches and holes can be distributed in a centralized or distributed manner; they can be distributed symmetrically or asymmetrically. Alternatively, the number of the protrusions, notches and/or dig holes is not limited.

In the special-shaped screen, since the upper forehead area and/or the lower forehead area of the touch screen are covered as a displayable area and/or an operable area, so that the touch-screen display takes up more space on the front panel of the terminal, so the special-shaped screen also has a greater screen ratio. In some implementations, the notches and/or holes are configured to accommodate at least one front panel component, which includes at least one of a camera, a fingerprint sensor, a proximity light sensor, a distance sensor, a handset, an ambient light brightness sensor, and a physical button.

Figure 5:
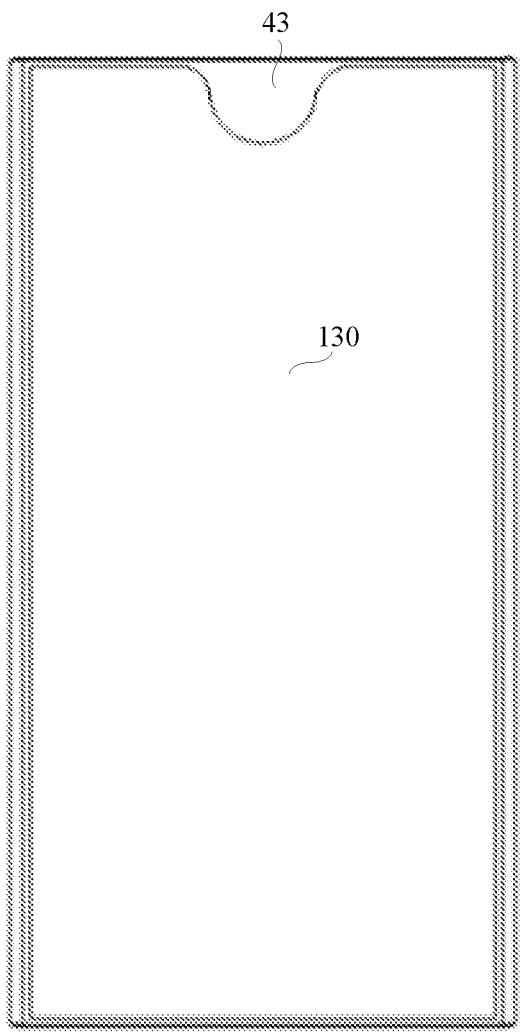
FIG. 5 is a schematic diagram of the appearance of the terminal according to another example implementation of the present disclosure.
Figure 6:
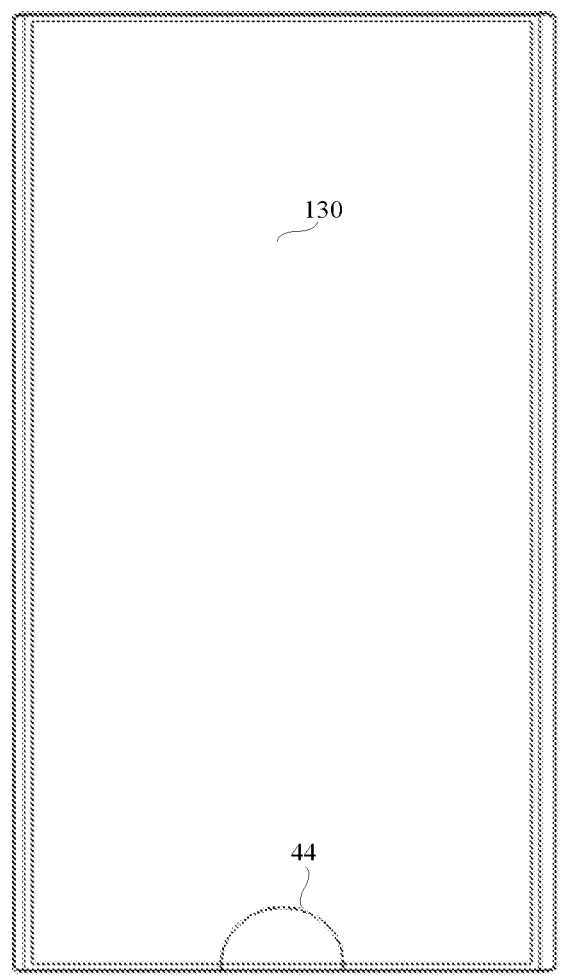
FIG. 6 is a schematic diagram of the appearance of the terminal according to another example implementation of the present disclosure.

For example, the notches may be provided on one or more edges of the touch screen 130, and the notch may be a semi-circular notch, a right-angled rectangular notch, a rounded rectangular notch, or an irregularly-shaped notch. In a schematic example illustrated in FIG. 5, the special-shaped screen may refer to a screen design in which a semi-circular notch 43 is provided in the middle of the upper edge of the touch screen 130. The space vacated by the semi-circular notch 43 is configured to accommodate at least one front panel component of the camera, the distance sensor (also known as a proximity sensor), the handset, and the ambient light brightness sensor. In a schematic example illustrated in FIG. 6, the special-shaped screen may refer to a screen design in which a semi-circular notch 44 is provided in the middle of the lower edge of the touch screen 130. The space vacated by the semi-circular notch 44 is configured to accommodate at least one component of a physical button, a fingerprint sensor, and a microphone. In a schematic example illustrated in FIG. 7, the special-shaped screen may refer to a screen design in which a semi-elliptical notch 45 is provided in the middle of the lower edge of the touch screen 130, and a semi-elliptical notch is also provided on the front panel of the terminal 100. Two semi-elliptical notches are enclosed into an elliptical area, which is configured to accommodate a physical button or a fingerprint recognition module. In a schematic example illustrated in FIG. 8, the special-shaped screen may refer to a screen design in which at least one small hole 46 is provided in the upper half of the touch screen 130. The space vacated by the small hole 46 is configured to accommodate at least one front panel component of the camera, the distance sensor, the handset, and the ambient light brightness sensor.

In addition, those skilled in the art may understand that the structure of the terminal 100 illustrated in the above drawings does not constitute a limitation of the terminal 100. The terminal may include more or fewer components than that illustrated in the figures, or combine some components, or have different component arrangements. For example, the terminal 100 may further includes components such as a radio frequency circuit, an input unit, a sensor, an audio circuit, a wireless fidelity (Wi-Fi®) module, a power supply, a Bluetooth module, and the like, which will not be described herein again.

A brief introduction of several terms involved in the present disclosure is first given below.

Android® operating system: a Linux-based free and open source operating system produced by Google Inc. of the United States, which is mainly used in mobile devices.

Application program ("application" for short): in the Android® operating system, an application usually includes at least one program component. There are four kinds of program components: activity components, service components, content provider components and broadcast receiver components.

An implementation of the present disclosure provides a method for displaying a shooting interface. The method is applied to a terminal in which an image acquisition component is integrated into a touch screen of the terminal. The method includes the followings. A first operation signal is received, where the first operation signal is a signal configured to enable the image acquisition component to perform shooting. The image acquisition component is enabled according to the first operation signal. A shooting interface is displayed on the touch screen, where the shooting interface is provided with a component location information which is a prompt information configured to indicate a location of the image acquisition component.

There are two ways adopted by the terminal to integrate the image acquisition component on the touch screen. One is that, a hole is defined in the top area or the bottom area of the touch screen, and the image acquisition component is integrated in the cavity formed by the hole. The other is that, the photosensitive element in the image acquisition component is divided into a plurality of photosensitive pixels, and each photosensitive pixel is integrated into a black area of each display pixel of all or part of the display area of the touch screen, so that the image acquisition component and the touch screen are completely integrated into one body. Illustratively, in the following implementations, the image acquisition component of the terminal is integrated in the touch screen in one of the above two ways for illustration. It should be noted that, in the present disclosure, the "first operation signal" may refer to a shoot signal input by a user when the terminal is in a front shooting mode. The "image acquisition component" may refer to a camera module that faces the user and is configured to shoot when the terminal is in the front shooting mode.

FIG. 9 is a flowchart of a method for displaying a shooting interface according to an example implementation of the present disclosure. The method for displaying a shooting interface can be applied to a terminal in which an image acquisition component is integrated into a touch screen. The method for displaying a shooting interface includes the following actions at blocks illustrated in FIG. 9.

At block 401, the terminal receives a first operation signal, where the first operation signal is a signal configured to enable the image acquisition component to perform shooting.

The user performs a first operation on the terminal. The first operation may be a sliding operation on the touch screen, a pressing operation on a physical button component of the terminal, or a clicking operation on an application icon on the touch screen related to the image acquisition component. For example, the application may be a shooting application, an online video call application, or a live video application.

After the user performs the first operation on the terminal, the CPU in the terminal receives the first operation signal. The first operation signal may be a sliding signal generated by the touch screen according to the user's sliding operation, or a pressing signal generated by the physical button component according to the user's pressing operation, or a pressing signal generated by the touch screen according to the user's click operation.

The touch screen or the physical button component reports the first operation signal to the CPU.

At block 402, the terminal enables the image acquisition component according to the first operation signal.

After receiving the first operation signal, a CPU in the terminal sends an instruction to the image acquisition component, where the instruction is configured to instruct the image acquisition component to start. After receiving the instruction from the terminal, the image acquisition component starts and enters a working mode.

At block 403, the terminal displays a shooting interface on the touch screen. The shooting interface is provided with a component location information which is a prompt information configured to indicate an edge contour/the location of the image acquisition component.

When the image acquisition component is enabled, the terminal displays the shooting interface on the touch screen. The shooting interface may be a user interface of a shooting application, a user interface of an online video call application, or a user interface of a live video application.

When the shooting interface is displayed on the touch screen, the component location information is displayed on the shooting interface. The component location information is located at the edge of the image acquisition component. The user can clearly determine the location of the image acquisition component through the component location information.

Illustratively, the technical solution of the present disclosure is described in detail by taking the user interface of the shooting application as an example.

FIG. 10 to FIG. 13 are schematic diagrams of a user interface of the shooting application according to an implementation of the present disclosure. As illustrated in the figures, the shooting application interface contains a component location information, a shooting mark 502, a switching mark 503 of image acquisition components, a photo preview mark 504, a shooting parameter mark 505, an effect mark 506, a flash mark 507, and a high-dynamic range (HDR) mark 508. In the example implementation, the terminal 100 further includes a rear image acquisition component (not illustrated).

Figure 10:
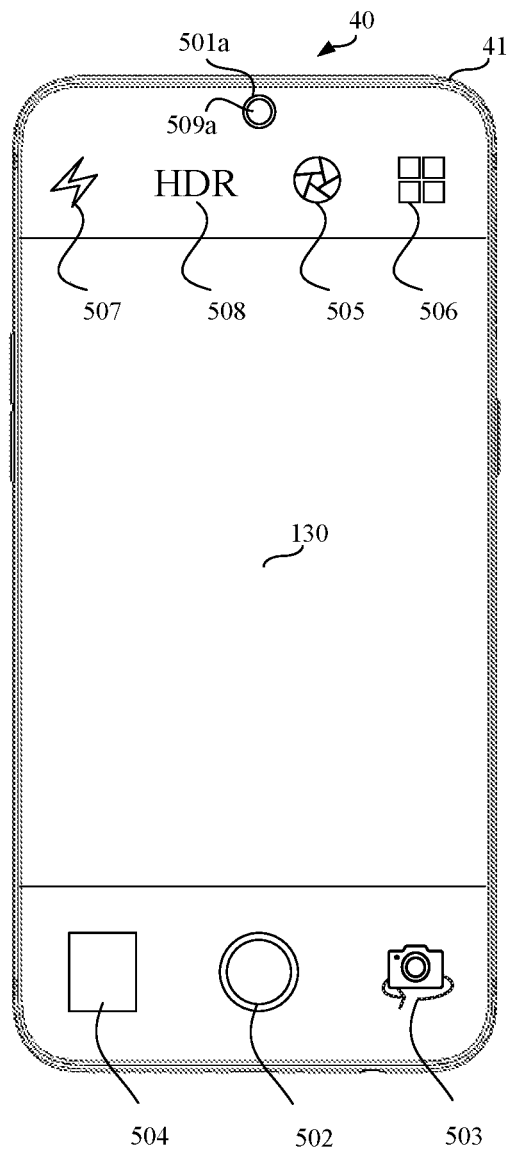
FIG. 10 is a schematic diagram of a user interface of the shooting application according to an example implementation of the present disclosure.

In an example implementation, as illustrated in FIG. 10, a hole 509a is defined on the touch screen 130, and an image acquisition component is integrated in a cavity formed by the hole 509a. The component location information is a contour mark 501a.

When the image acquisition component is enabled, the contour mark 501a is displayed on the edge of the hole 509a, so that the user can clearly determine the location of the image acquisition component through the contour mark 501a.

Figure 11:
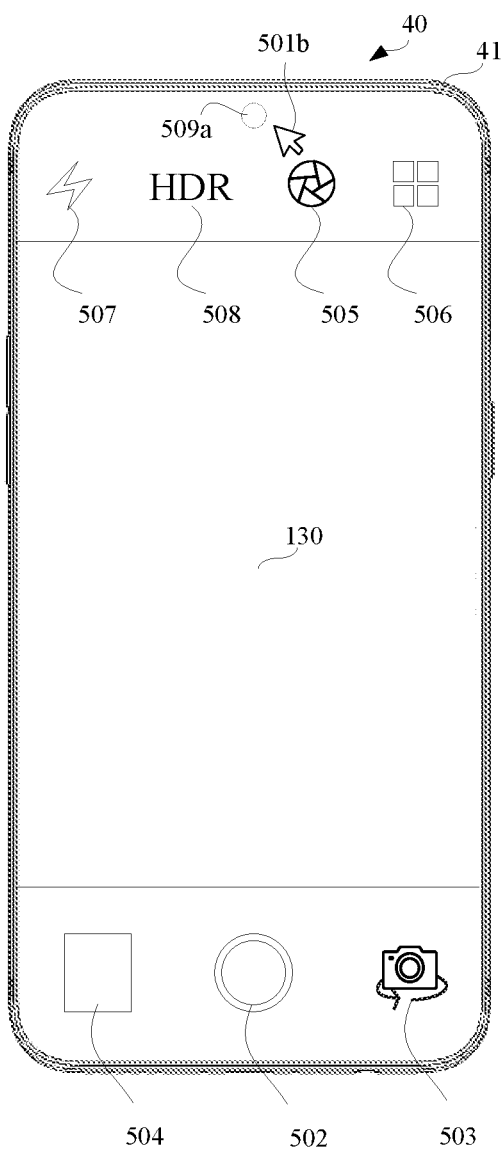
FIG. 11 is a schematic diagram of a user interface of the shooting application according to an example implementation of the present disclosure.

In an example implementation, as illustrated in FIG. 11, the hole 509a is defined on the touch screen 130, and the image acquisition component is integrated in the cavity formed by the hole 509a. The component location information is a location mark 501b. In the example implementation, the location mark 501b is illustrated as a arrow.

When the image acquisition component is enabled, the location mark 501b is displayed on the periphery of the hole 509a, and the location mark 501b points to the hole 509a, so that the user can clearly determine the location of the image acquisition component through the location mark 501b.

In an example implementation, as illustrated in FIG. 12, the photosensitive element in the image acquisition component is divided into a plurality of photosensitive pixels, and each photosensitive pixel is integrated into a black area of each display pixel in a predetermined area 509b, so that the image acquisition component and the touch screen are completely integrated into one body. The component location information is a contour mark 501c.

When the image acquisition component is enabled, the contour mark 501c is displayed on the edge of the predetermined area 509b, so that the user can clearly determine the location of the image acquisition component through the contour mark 501c.

In an example implementation, as illustrated in FIG. 13, the photosensitive element in the image acquisition component is divided into a plurality of photosensitive pixels, and each photosensitive pixel is integrated into a black area of each display pixel in the predetermined area 509b, so that the image acquisition component and the touch screen are completely integrated into one body. The component location information is a location mark 501d. In the example implementation, the location mark 501d is illustrated as a arrow.

When the image acquisition component is enabled, the location mark 501d is displayed on the periphery of the predetermined area 509b, and the location mark 501d points to the predetermined area 509b, so that the user can clearly determine the location of the image acquisition component through the location mark 501d.

In the shooting application interface, a shooting operation may be finished by the user clicking the shooting mark 502; a working image acquisition component may be switched to another image acquisition component by the user clicking the switching mark 503 of the image acquisition components, for example, a rear image acquisition component is currently in use, when the switching mark 503 of the image acquisition components is clicked, the rear image acquisition component stops working, and a front image acquisition component starts to work; photos may be previewed by the user clicking the photo preview mark 504 to enter a photo preview mode; shooting parameters may be selected by the user clicking the shooting parameter mark 505, where the shooting parameters can be an aperture value, a shutter value, an exposure value, a sensitivity value, etc.; shooting effects, such as a black and white mode, an old photo mode, a film simulation mode, etc., may be selected by the user clicking the effect mark 506; flash working modes, such as a mode for forcibly turning on the flash, a mode for automatically turning on the flash, a mode for turning off the flash, etc., may be selected by the user clicking the flash mark 507; HDR modes, such as an on mode of the HDR, an auto mode of the HDR, an off mode of the HDR, etc., may be selected by the user clicking the HDR mark 508.

In summary, in the method for displaying a shooting interface provided in the implementation, the shooting interface is displayed on the touch screen of the terminal, where the shooting interface is provided with the component location information, and the component location information is the prompt information configured to indicate the location of the image acquisition component, which solves the problem that the user cannot easily identify the location of the image acquisition component when the terminal is in the front shooting mode because the image acquisition component and the touch screen are integrated into one body on vision when the image acquisition component is integrated into the touch screen of the terminal, and enables the user to clearly determine the location of the image acquisition component according to the component location information displayed on the shooting interface when using the image acquisition component of the terminal in which the image acquisition component is integrated into the touch screen, thereby facilitating the user to use the image acquisition component to aim at a target object for shooting when the terminal is in the front shooting mode.

Figure 14:
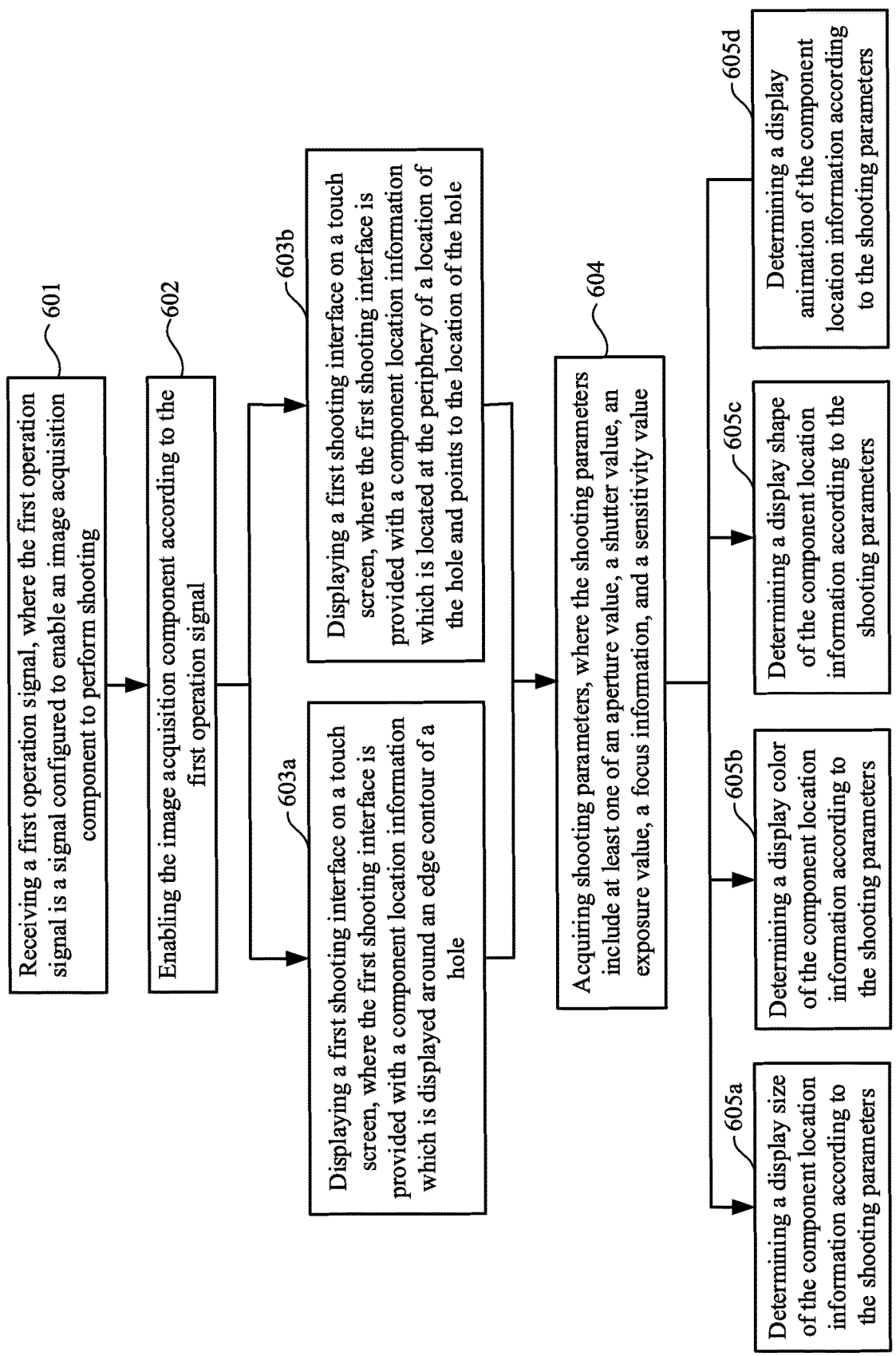
FIG. 14 is a flowchart of a method for displaying a shooting interface according to another example implementation of the present disclosure.

FIG. 14 is a flowchart of a method for displaying a shooting interface according to an example implementation of the present disclosure. The method for displaying a shooting interface can be applied to a terminal in which an image acquisition component is integrated into a touch screen. The touch screen of the terminal is provided with a hole, and the image acquisition component is integrated into a cavity formed by the hole. The method for displaying a shooting interface includes the following actions at blocks illustrated in FIG. 14.

At block 601, the terminal receives a first operation signal, where the first operation signal is a signal configured to enable the image acquisition component to perform shooting.

The user performs a first operation on the terminal. The first operation may be a sliding operation on the touch screen, a pressing operation on a physical button component of the terminal, or a clicking operation on an application icon on the touch screen related to the image acquisition component. For example, the application may be a shooting application, an online video call application, or a live video application.

After the user performs the first operation on the terminal, the CPU in the terminal receives the first operation signal. The first operation signal may be a sliding signal generated by the touch screen according to the user's sliding operation, or a pressing signal generated by the physical button component according to the user's pressing operation, or a pressing signal generated by the touch screen according to the user's click operation.

The touch screen or the physical button component reports the first operation signal to the CPU.

At block 602, the terminal enables the image acquisition component according to the first operation signal.

After receiving the first operation signal, a CPU in the terminal sends an instruction to the image acquisition component, where the instruction is configured to instruct the image acquisition component to start. After receiving the instruction from the terminal, the image acquisition component starts and enters a working mode, and the process goes to the actions at block 603a or block 603b.

At block 603a, the terminal displays a first shooting interface on the touch screen. The first shooting interface is provided with a component location information which is displayed around an edge contour of the hole.

When the image acquisition component is enabled, the terminal displays the first shooting interface on the touch screen. The first shooting interface may be a user interface of a shooting application, or a user interface of an online video call application, or a user interface of a live video application.

When the first shooting interface is displayed on the touch screen, the component location information is displayed on the first shooting interface. The component location information is displayed around the edge contour of the hole. The component location information is a prompt information configured to indicate the edge contour of the hole. The user can clearly determine the location of the image acquisition component through the component location information.

In an example implementation, the first shooting interface is a user interface of the shooting application illustrated in FIG. 10. As illustrated in the figure, the hole 509a is defined on the touch screen 130. The image acquisition component is integrated into the cavity formed by the hole 509a. The component location information is the contour mark 501a, and the contour mark 501a is displayed around the edge of the hole 509a. The user can clearly determine the location of the image acquisition component through the contour mark 501a.

At block 603b, the terminal displays the first shooting interface on the touch screen. The first shooting interface is provided with a component location information which is located at the periphery of a location of the hole and points to the location of the hole.

When the image acquisition component is enabled, the terminal displays the first shooting interface on the touch screen. The first shooting interface may be the user interface of the shooting application, or the user interface of the online video call application, or the user interface of the live video application.

When the first shooting interface is displayed on the touch screen, the component location information is displayed on the first shooting interface. The component location information is located at the periphery of the location of the hole and points to the location of the hole. The user can clearly determine the location of the image acquisition component through the component location information.

In an example implementation, the first shooting interface is the user interface of the shooting application illustrated in FIG. 11. As illustrated in the figure, the hole 509a is defined on the touch screen 130. The image acquisition component is integrated into the cavity formed by the hole 509a. The component location information is the location mark 501b, and the location mark 501b is located at the periphery of the location of the hole 509a and points to the location of the hole 509a. The user can clearly determine the location of the image acquisition component through the location mark 501b.

Figure 15:
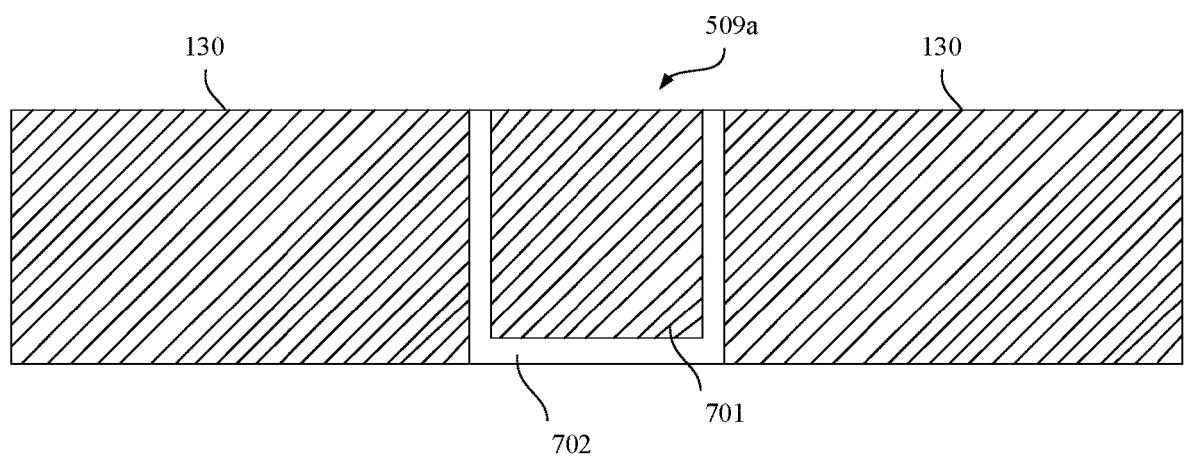
FIG. 15 is a cross-sectional view of a touch screen which uses a circular hole to integrate an image acquisition component according to an example implementation of the present disclosure.

FIG. 15 is a cross-sectional view of a touch screen which uses a hole to integrate the image acquisition component. As illustrated, the touch screen 130 is provided with the hole 509a, the image acquisition component 701 is arranged in a cavity 702 formed by the hole 509a, and the image acquisition component 701 and the touch screen 130 are integrated into one body on vision.

At block 604, the terminal acquires shooting parameters. The shooting parameters include at least one of an aperture value, a shutter value, an exposure value, a focus information, and a sensitivity value.

The terminal may acquire the shooting parameters through a built-in program. The shooting parameters may be at least one of the aperture value, the shutter value, the exposure value, the focus information, and the sensitivity value.

An aperture is a device used to control the amount of light that passes through lens and enters the photosensitive element. For the image acquisition component arranged in the terminal, it is usually provided no adjustable physical aperture. Therefore, the aperture in the terminal is the result of simulation by the built-in program, which corresponds to the light flux and depth of field of the image acquisition component. The greater the light flux of the image acquisition component, the less the aperture value; and the less the light flux, the greater the aperture value. The shallower the depth of field of the image acquisition component, the less the aperture value; and the deeper the depth of field, the greater the aperture value.

Shutter speed is a physical quantity related to exposure time. The faster the shutter speed, the shorter the exposure time; and the slower the shutter speed, the longer the exposure time. At the same time, the shutter value is inversely proportional to the shutter speed. The greater the shutter value, the slower the shutter speed; and the less the shutter value, the faster the shutter speed.

Sensitivity is the speed at which the photosensitive element responds to light. The higher the sensitivity value, the faster the speed at which the photosensitive element responds to light.

The focus information reflects the sharpness of the image of a focusing area. For example, the terminal determines whether the sharpness of the image of the focusing area is the highest according to the image information collected by the image acquisition component. If so, it's determined that the focusing is successful.

The exposure value corresponds to a combination of shooting parameters. The greater the exposure value, the combination of the shooting parameters is adjusted in a brighter direction of the photo; the less the exposure value, the combination of the shooting parameters is adjusted in a dimmer direction of the photo.

At block 605a, the terminal determines a display size of the component location information according to the shooting parameters.

The terminal adjusts the display size of the component location information according to the acquired parameters. For example, when the acquired parameters are within their normal ranges, the component location information is displayed in a normal size; when the acquired parameters are out of their normal ranges, the component location information is displayed in a first size bigger than the normal size or a second size smaller than the normal size.

Specifically, when the aperture value is less than a minimum value of a normal range of the aperture value, and the corresponding aperture is bigger, the component location information is displayed in a first size bigger than the normal size; when the aperture value is greater than a maximum value of the normal range of the aperture value, and the corresponding aperture is smaller, the component location information is displayed in a second size smaller than the normal size. When the shutter value is greater than a maximum value of a normal range of the shutter value, the component location information is displayed in a first size bigger than the normal size; when the shutter value is less than a minimum value of the normal range of the shutter value, the component location information is displayed in a second size smaller than the normal size. When the exposure value is greater than a maximum value of a normal range of the exposure value, the component location information is displayed in a first size bigger than the normal size; when the exposure value is less than a minimum value of the normal range of the exposure value, the component location information is displayed in a second size smaller than the normal size. When a focusing fails, the component location information is displayed in a second size smaller than the normal size; when the focusing is successful, the component location information is displayed in the normal size bigger than the second size. When the sensitivity value is greater than a maximum value of a normal range of the sensitivity value, the component location information is displayed in a first size bigger than the normal size; when the sensitivity value is less than a minimum value of the normal range of the sensitivity value, the component location information is displayed in a second size smaller than the normal size.

Illustratively, the method for controlling shooting parameters is described in detail by taking the user interface of the shooting application as an example.

Figure 16:
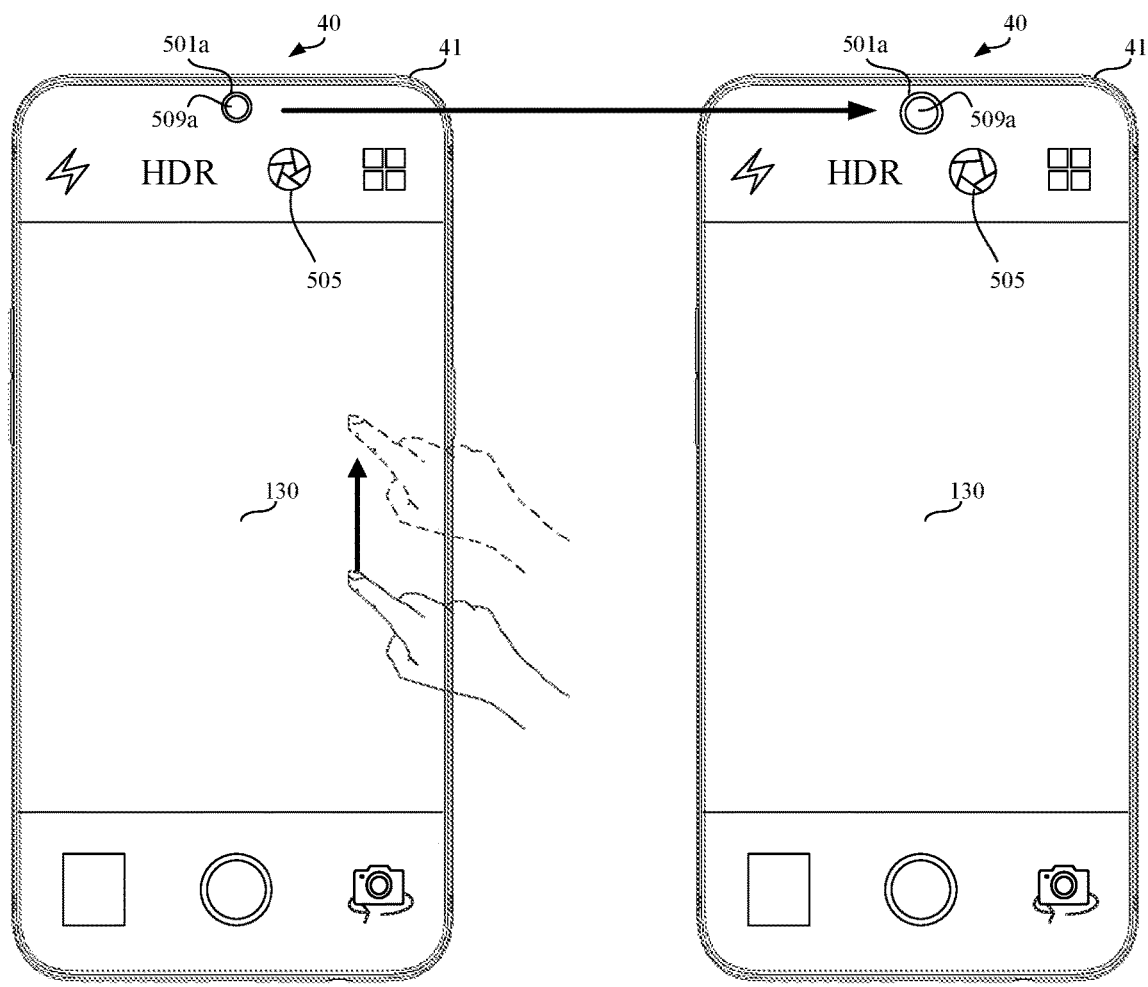
FIG. 16 is a schematic diagram of controlling shooting parameters according to an example implementation of the present disclosure.

FIG. 16 shows a schematic diagram of a method for controlling shooting parameters according to an implementation of the present disclosure. In the present implementation, the component location information is the contour mark 501a.

As illustrated in the left figure of FIG. 16, the user interface of the shooting application is displayed on the touch screen 130. The user interface contains the contour mark 501a and the shooting parameter mark 505.

Taking the shooting parameter mark 505 being an aperture value mark as an example, when the user clicks the shooting parameter mark 505 to select the aperture value mark, the user can use a finger to slide on the touch screen 130, and the touch screen 130 generates a sliding signal according to the user's sliding operation. The sliding signal is the second operation signal mentioned above. The touch screen 130 reports the second operation signal to the CPU in the terminal, and then the CPU adjusts the aperture value according to the second operation signal. If the aperture value becomes greater, as illustrated in the right figure of FIG. 16, the aperture icon corresponding to the aperture value mark 505 is displayed as a large aperture icon. At the same time, the contour mark 501a will also becomes bigger and its contour line will become thicker accordingly.

Similarly, when the shooting parameter selected by the user is the exposure value, the shutter value, or the sensitivity value, if a slide operation is performed on the touch screen 130, the touch screen 130 generates a slide signal according to the user's slide operation, and the slide signal is a third operation signal or a fourth operation signal. The touch screen 130 reports the third operation signal or the fourth operation signal to the CPU in the terminal, and the CPU adjusts the exposure value, the shutter value, or the sensitivity value according to the third operation signal or the fourth operation signal reported by the touch screen 130. The size and/or the thickness of the contour line of the contour mark 501a are also changed as the exposure value, the shutter value, or the sensitivity value changes.

Similarly, when the component location information is a location mark, the size of the location mark can also be changed by changing the shooting parameters.

It should be noted that the above determination of the size of the component location information according to the shooting parameters, and the selection of the shooting parameters by clicking the shooting parameter marks and then changing operating parameters by sliding operations are only example, and are not limited to this in practical applications.

At block 605b, the terminal determines a display color of the component location information according to the shooting parameters.

The terminal adjusts the color of the component location information according to the acquired parameters. For example, when the acquired parameters are within their normal ranges, the component location information is displayed in a normal color; when the acquired parameters are out of their normal ranges, the component location information is displayed in a first color brighter than the normal color or a second color dimmer than the normal color.

Specifically, when the aperture value is less than a minimum value of a normal range of the aperture value, and the corresponding aperture is bigger, the component location information is displayed in a first color brighter than the normal color. When the aperture value is greater than a maximum value of the normal range of the aperture value, and the corresponding aperture is smaller, the component location information is displayed in a second color dimmer than the normal color. Since the light flux of the image acquisition component is greater when the aperture is bigger, so a brighter color is configured to remind the user that the aperture is bigger and the light flux is greater at this time. Correspondingly, since the light flux of the image acquisition component is less when the aperture is smaller, so a dimmer color is configured to remind the user that the aperture is smaller and the light flux is less at this time.

When the shutter value is greater than a maximum value of a normal range of the shutter value, the component location information is displayed in a second color dimmer than the normal color. When the shutter value is less than a minimum value of the normal range of the shutter value, the component location information is displayed in a first color brighter than the normal color. Since the shutter speed is slower when the shutter value is greater, and hand-held shooting may easily lead to unclear photos, so a dimmer color is configured to remind the user that the shutter speed is slower at this time and photos to be taken at this time are likely blurred. Since the shutter speed is faster when the shutter value is less, so a brighter color is configured to indicate that the shutter speed is faster at this time and it is safe to shoot.

When the exposure value is greater than a maximum value of a normal range of the exposure value, the component location information is displayed in a first color brighter than the normal color. When the exposure value is less than a minimum value of the normal range of the exposure value, the component location information is displayed in a second color dimmer than the normal color. Since the photos taken when the exposure value is greater are generally brighter, so a brighter color is configured to remind the user that the exposure value is greater at this time and photos to be taken at this time will be brighter. Correspondingly, since the photo taken when the exposure value is less are generally dimmer, so a dimmer color is configured to remind the user that the exposure value is less at this time and photos to be taken at this time will be dimmer.

When the focusing fails, the component location information is displayed in a second color dimmer than the normal color to remind the user that the focusing has not been successful and it is not suitable for shooting. When the focusing is successful, the component location information is displayed in the normal color brighter than the second color to remind the user that the focusing has been successful and it is suitable for shooting.

When the sensitivity value is greater than a maximum value of a normal range of the sensitivity value, the component location information is displayed in a second color dimmer than the normal color. When the sensitivity value is less than a minimum value of the normal range of the sensitivity value, the component location information is displayed in a first color brighter than the normal color. Since the photos taken when the sensitivity value is greater have more noise points, so a dimmer color is configured to remind the user that the sensitivity value is greater and image quality of photos to be taken will be poor. Correspondingly, since the photos taken when the sensitivity value is less have fewer noise points, so a brighter color is configured to remind the user that the sensitivity value is less and image quality of photos to be taken will be better.

In the above implementation, the color of the component location information may be different depending on the shooting parameters.

It should be noted that the above-mentioned determination of the display color of the component location information according to the shooting parameters is merely example, and is not limited to this in practical applications.

Same as the action at block 605a, at block 605b, the shooting parameters can be controlled according to the user's operation. For example, after clicking to select a shooting parameter, the value of the shooting parameter can be changed by sliding. At the same time, the display color of the component location information changes with the change of the shooting parameter.

At block 605c, the terminal determines a display shape of the component location information according to the shooting parameters.

The terminal adjusts the display shape of the component location information according to the acquired parameters. For example, when the acquired parameters are within their normal ranges, the contour lines of the component location information are displayed in normal solid lines; when the acquired parameters are out of their normal ranges, the contour lines of the component location information are displayed in dotted lines/thick solid lines.

Specifically, when the aperture value is less than a minimum value of a normal range of the aperture value, and the corresponding aperture is bigger, the contour lines of the component location information are displayed in dotted lines. When the aperture value is greater than a maximum value of the normal range of the aperture value, and the corresponding aperture is smaller, the contour lines of the component location information are displayed in thick solid lines. Since the photos taken when the aperture is bigger have shallower depth of field, so dotted lines representing blur are configured to remind the user that the aperture is bigger and the light flux is greater at this time. Correspondingly, since the photos taken when the aperture is smaller have deeper depth of field, so thick solid lines representing clear are configured to remind the user that the aperture is smaller and the light flux is less at this time.

When the shutter value is greater than a maximum value of a normal range of the shutter value, the contour lines of the component location information are displayed in dotted lines. When the shutter value is less than a minimum value of the normal range of the shutter value, the contour lines of the component location information are displayed in thick solid lines. Since the shutter speed is slower when the shutter value is greater, and hand-held shooting may easily lead to unclear photos, so dotted lines representing blur are configured to remind the user that the shutter speed is slower at this time and photos to be taken at this time are likely blurred. Since the shutter speed is faster when the shutter value is less, so thick solid lines representing clear are configured to indicate that the shutter speed is faster at this time and it is safe to shoot.

When the exposure value is greater than a maximum value of a normal range of the exposure value, the contour lines of the component location information are displayed in thick solid lines. When the exposure value is less than a minimum value of the normal range of the exposure value, the contour lines of the component location information are displayed in dotted lines. Since the photos taken when the exposure value is greater are brighter, so thick solid lines representing clear are configured to remind the user that the exposure value is greater at this time and photos to be taken will be brighter. Correspondingly, since the photo taken when the exposure value is less are dimmer, so dotted lines representing blur are configured to remind the user that the exposure value is less at this time and photos to be taken at this time will be dimmer.

When the focusing fails, the contour lines of the component location information are displayed in dotted lines to remind the user that the focusing has not been successful and it is not suitable for shooting. When the focusing is successful, the contour lines of the component location information are displayed in normal solid lines to remind the user that the focusing has been successful and it is suitable for shooting.

When the sensitivity value is greater than a maximum value of a normal range of the sensitivity value, the contour lines of the component location information are displayed in dotted lines. When the sensitivity value is less than a minimum value of the normal range of the sensitivity value, the contour lines of the component location information are displayed in thick solid lines. Since the photos taken when the sensitivity value is greater have more noise points, so dotted lines representing blur are configured to remind the user that the sensitivity value is greater and image quality of photos to be taken will be poor. Correspondingly, since the photos taken when the sensitivity value is less have fewer noise points, so thick solid lines representing clear are configured to remind the user that the sensitivity value is less and image quality of photos to be taken will be better.

In the above implementation, when the shooting parameters are different, the shape of the component location information may be different.

It should be noted that the above-mentioned determination of the display shape of the component location information according to the shooting parameters is merely example, and is not limited to this in practical applications.

Same as the action at block 605a, at block 605c, the shooting parameters can be controlled according to the user's operation. For example, after clicking to select a shooting parameter, the value of the shooting parameter can be changed by sliding. At the same time, the display shape of the component location information changes with the change of the shooting parameter.

At block 605d, the terminal determines a display animation of the component location information according to the shooting parameters.

The terminal adjusts the display animation of the component location information according to the acquired parameters.

For example, when the aperture value is less than a fourth threshold value, and the corresponding aperture is bigger, the display animation of the component location information has a constant brightness. When the aperture value is greater than the fourth threshold value, and the corresponding aperture is smaller, the display animation of the component location information is a gradient animation having a brightness changed from bright to dim and then from dim to bright. Since the light flux of the image acquisition component is greater when the aperture is bigger, so a component location information having a constant brightness is configured to remind the user that the aperture is bigger and the light flux is greater at this time, and photos to be taken will be normal. Correspondingly, since the light flux of the image acquisition component is less when the aperture is smaller, so a gradient animation having breathing effects that a brightness is changed from bright to dim and then from dim to bright, is configured to remind the user that the aperture is smaller and the light flux is less at this time, and photos to be taken will be dim or fuzzy.

When the shutter value is greater than a first threshold value and its corresponding shutter speed is slower, the display animation of the component location information is a gradient animation having a brightness changed from bright to dim and then from dim to bright. When the shutter value is less than the first threshold value and its corresponding shutter speed is faster, the display animation of the component location information has a constant brightness. Since the photos taken when the shutter speed is slower tend to be blurred, so a gradient animation having breathing effects that a brightness is changed from bright to dim and then from dim to bright, is configured to remind the user that the shutter speed is slower at this time and photos to be taken at this time are likely blurred. Since the shutter speed is faster when the shutter value is less, so a component location information having a constant brightness is configured to remind the user that the shutter speed is faster at this time and it is safe to shoot.

When the exposure value is greater than a second threshold value, or when the exposure value is less than a third threshold value, the display animation of the component location information is a gradient animation having a brightness changed from bright to dim and then from dim to bright, where the third threshold value is less than the second threshold value. Since it is overexposed when the exposure value is greater than the second threshold value, and it is underexposed when the exposure value is less than the third threshold value, so a gradient animation having breathing effects that a brightness is changed from bright to dim and then from dim to bright, is configured to remind the user that it is overexposed or underexposed. When the exposure value is between the third threshold value and the second threshold value, the display animation of the component location information has a constant brightness, which reminds the user that the exposure is normal.

When the focusing fails, the display animation of the component location information has a constant brightness, which reminds the user that the focusing has not been successful and it is not suitable for shooting. When the focus information indicates that the focusing is successful, the display animation of the component location information is a flashing display, which reminds the user that it is suitable for shooting.

When the sensitivity value is greater than a fifth threshold value, the display animation of the component location information is a gradient animation having a brightness changed from bright to dim and then from dim to bright. When the sensitivity value is less than the fifth threshold value, the display animation of the component location information has a constant brightness. Since the photos taken when the sensitivity value is greater have more noise points, so a gradient animation having breathing effects that a brightness is changed from bright to dim and then from dim to bright, is configured to remind the user that the sensitivity value is greater and image quality of photos to be taken will be poor. Correspondingly, since the photos taken when the sensitivity value is less have fewer noise points, so a component location information having a constant brightness is configured to remind the user that the sensitivity value is less and image quality of photos to be taken will be better.

It should be noted that the above-mentioned determination of the display animation of the component location information according to the shooting parameters is merely example, and is not limited to this in practical applications.

Same as the action at block 605a, at block 605d, the shooting parameters can be controlled according to the user's operation. For example, after clicking to select a shooting parameter, the value of the shooting parameter can be changed by sliding. At the same time, the display animation of the component location information changes with the change of the shooting parameter.

It should be noted that the actions at block 605a, 605b, 605c, and 605d may be performed in series, or only the action at block 605a, 605b, 605c, or 605d be performed.

In summary, in the method for displaying a shooting interface provided in the implementation, the first shooting interface is displayed on the touch screen of the terminal, where the first shooting interface is provided with the component location information, and the component location information is the prompt information configured to indicate the edge contour of the image acquisition component, which solves the problem that the user cannot easily identify the location of the image acquisition component when the terminal is in the front shooting mode because the image acquisition component and the touch screen are integrated into one body on vision when the image acquisition component is integrated into the touch screen of the terminal, and enables the user to clearly determine the location of the image acquisition component according to the component location information displayed on the shooting interface when using the image acquisition component of the terminal in which the image acquisition component is integrated into the touch screen, thereby facilitating the user to use the image acquisition component to aim at a target object for shooting when the terminal is in the front shooting mode.

Further, in the method for displaying a shooting interface provided in the implementation, by determining at least one of the display size, the display color, the display shape, and the display animation of the component location information is determined according to the shooting parameters, the user can intuitively know the influence of the shooting parameters on the shooting effect through at least one of the display size, the display color, the display shape, and the display animation of the component location information, which is convenient for the user to adjust the shooting parameters according to at least one of the prompts including the display size, the display color, the display shape, and the display animation of the component location information.

Figure 18:
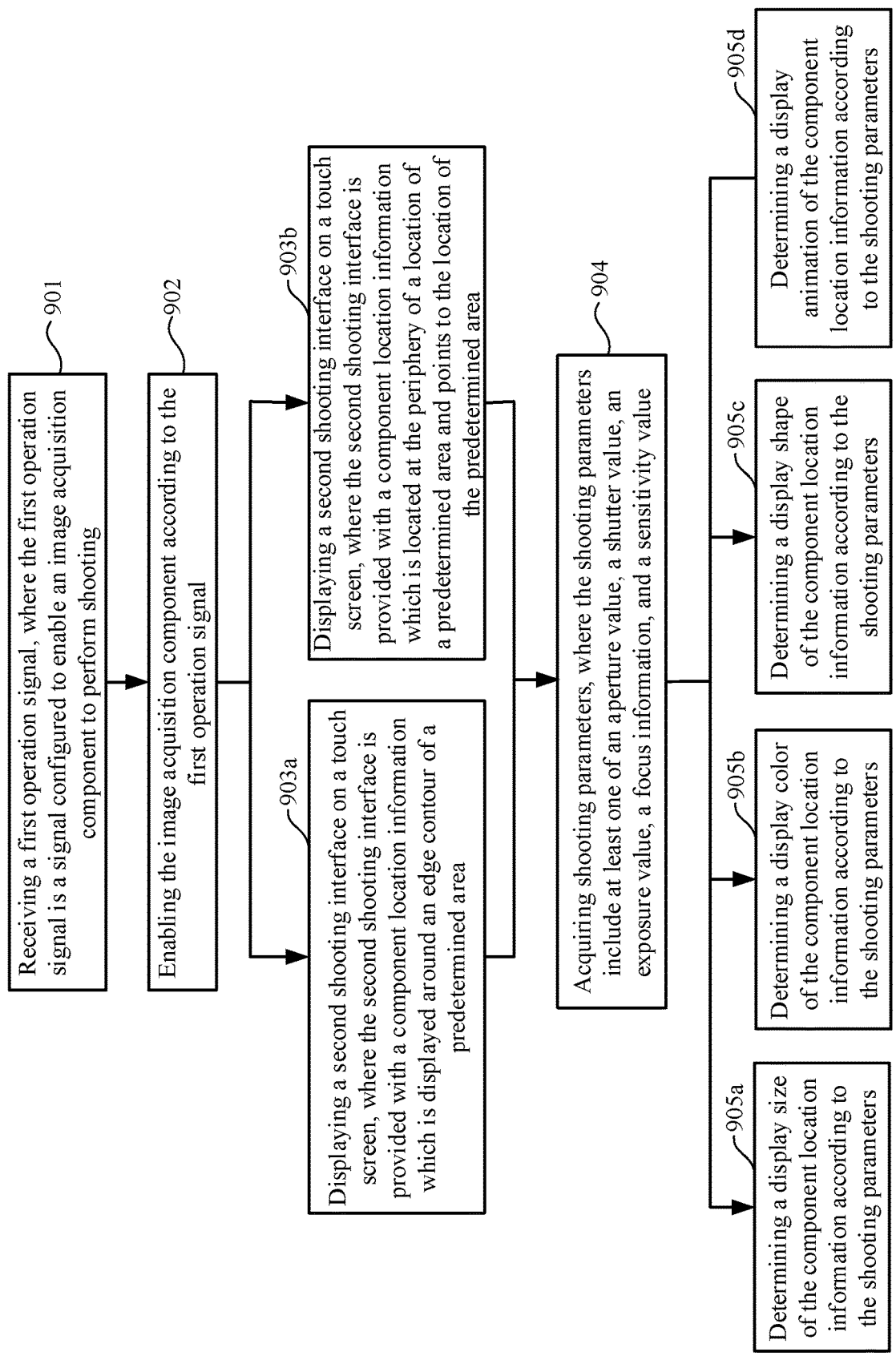
FIG. 18 is a flowchart of a method for displaying a shooting interface according to another example implementation of the present disclosure.

FIG. 18 is a flowchart of a method for displaying a shooting interface according to an example implementation of the present disclosure. The method for displaying a shooting interface can be applied to a terminal in which an image acquisition component is integrated into a touch screen. In the terminal, the photosensitive element in the image acquisition component is divided into a plurality of photosensitive pixels, and each photosensitive pixel is dispersedly integrated in a predetermined area of the touch screen. The method for displaying a shooting interface includes the following actions at blocks illustrated in FIG. 18.

At block 901, the terminal receives a first operation signal, where the first operation signal is a signal configured to enable the image acquisition component to perform shooting.

The user performs a first operation on the terminal. The first operation may be a sliding operation on the touch screen, a pressing operation on a physical button component of the terminal, or a clicking operation on an application icon on the touch screen related to the image acquisition component. For example, the application may be a shooting application, an online video call application, or a live video application.

After the user performs the first operation on the terminal, the CPU in the terminal receives the first operation signal. The first operation signal may be a sliding signal generated by the touch screen according to the user's sliding operation, or a pressing signal generated by the physical button component according to the user's pressing operation, or a pressing signal generated by the touch screen according to the user's click operation.

The touch screen or the physical button component reports the first operation signal to the CPU.

At block 902, the terminal enables the image acquisition component according to the first operation signal.

After receiving the first operation signal, a CPU in the terminal sends an instruction to the image acquisition component, where the instruction is configured to instruct the image acquisition component to start. After receiving the instruction from the terminal, the image acquisition component starts and enters a working mode, and the process goes to the actions at block 903a or block 903b.

At block 903a, a second shooting interface is displayed on the touch screen. The second shooting interface is provided with a component location information which is displayed around an edge contour of the predetermined area.

When the image acquisition component is enabled, the terminal displays the second shooting interface on the touch screen. The second shooting interface may be a user interface of a shooting application, or a user interface of an online video call application, or a user interface of a live video application.

When the second shooting interface is displayed on the touch screen, the component location information is displayed on the second shooting interface. The component location information is displayed around the edge contour of the predetermined area. The component location information is a prompt information configured to indicate the edge contour of the image acquisition component. The user can clearly determine the location of the image acquisition component through the component location information.

In an example implementation, the second shooting interface is a user interface of the shooting application illustrated in FIG. 12. As illustrated in the figure, a predetermined area 509b of the touch screen 130 is integrated with the image capturing component. The photosensitive element in the image acquisition component is divided into a plurality of photosensitive pixels, and each photosensitive pixel is integrated into a black area of each display pixel in the predetermined area 509b, so that the image acquisition component and the touch screen are completely integrated into one body. The component location information is the contour mark 501c, and the contour mark 501c is displayed around the edge of the predetermined area 509b, to indicate the edge counter of the image acquisition component. The user can clearly determine the location of the image acquisition component through the contour mark 501c.

At block 903b, the terminal displays the second shooting interface on the touch screen. The second shooting interface is provided with a component location information which is located at the periphery of the location of the predetermined area and points to the location of the predetermined area.

When the image acquisition component is enabled, the terminal displays the second shooting interface on the touch screen. The second shooting interface may be the user interface of the shooting application, or the user interface of the online video call application, or the user interface of the live video application.

When the second shooting interface is displayed on the touch screen, the component location information is displayed on the second shooting interface. The component location information is located at the periphery of the location of the predetermined area and points to the location of the predetermined area. The user can clearly determine the location of the image acquisition component through the component location information.

In an example implementation, the second shooting interface is the user interface of the shooting application illustrated in FIG. 13. As illustrated in the figure, the predetermined area 509b of the touch screen 130 is integrated with the image capturing component. The photosensitive element in the image acquisition component is divided into a plurality of photosensitive pixels, and each photosensitive pixel is integrated into a black area of each display pixel in the predetermined area 509b, so that the image acquisition component and the touch screen are completely integrated into one body. The component location information is the location mark 501d, and the location mark 501d is located at the periphery of the location of the predetermined area 509b and points to the location of the predetermined area 509b. The user can clearly determine the location of the image acquisition component through the location mark 501b.

Figure 19:
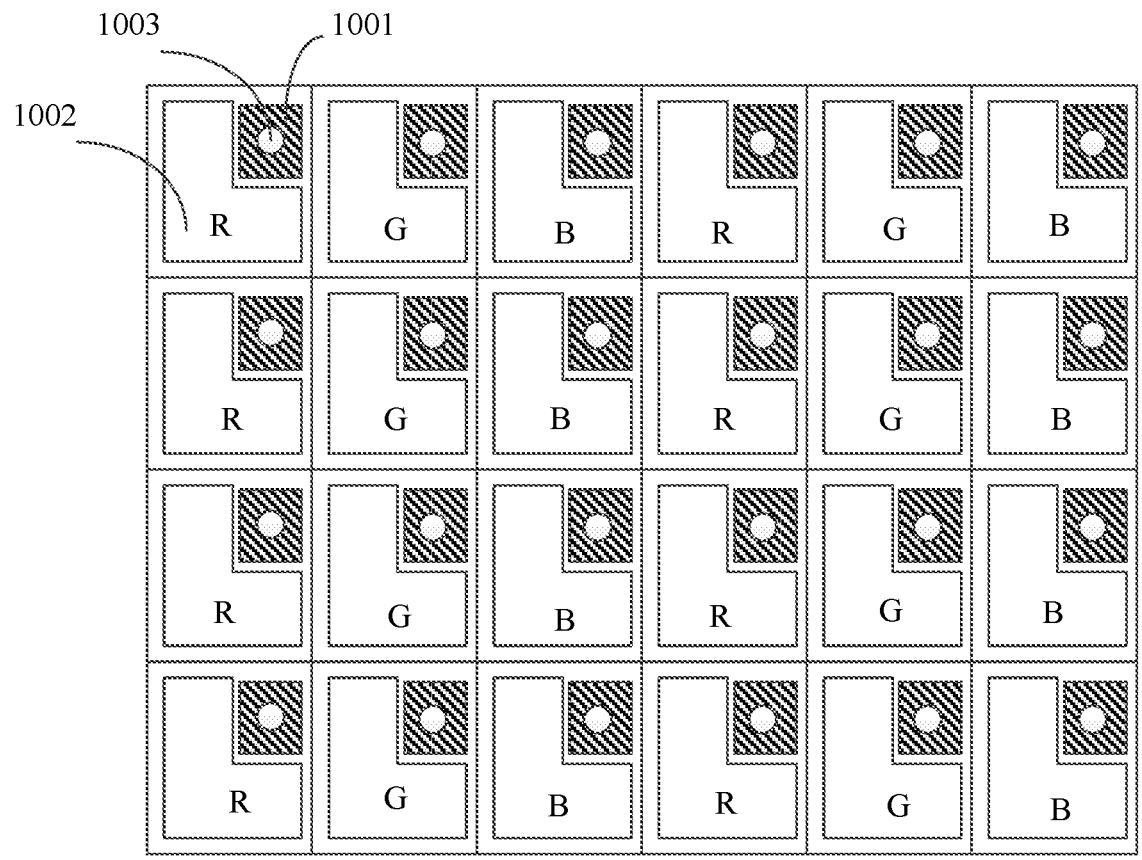
FIG. 19 is a diagram of a display pixel array of a touch screen with integrated photosensitive pixels according to an example implementation of the present disclosure.

FIG. 19 is a diagram of a display pixel array of a touch screen with integrated photosensitive pixels. As illustrated in the figure, each display pixel includes three sub-pixel units, which are R (red) sub-pixel unit, G (green) sub-pixel unit, and B (blue) sub-pixel unit. Each sub-pixel unit 1002 has a black area 1001. Each photosensitive pixel 1003 of the image acquisition component is integrated in the black area 1001 of each sub-pixel unit 1002. The predetermined area 509b in which the display pixels integrated with the photosensitive pixels 1003 is the location of the image acquisition component. When the image acquisition component is started, the display pixels located in the predetermined area 509b are in an off state, so that the image pickup component light-sensitive pixels 1003 located in the predetermined area 509b can work normally.

At block 904, the terminal acquires shooting parameters. The shooting parameters include at least one of an aperture value, a shutter value, an exposure value, a focus information, and a sensitivity value.

The terminal may acquire the shooting parameters through a built-in program. The shooting parameters may be at least one of the aperture value, the shutter value, the exposure value, a focus information, and the sensitivity value.

An aperture is a device used to control the amount of light that passes through lens and enters the photosensitive element. For the image acquisition component arranged in the terminal, it is usually provided no adjustable physical aperture. Therefore, the aperture in the terminal is the result of simulation by the built-in program, which corresponds to the light flux and depth of field of the image acquisition component. The greater the light flux of the image acquisition component, the less the aperture value; and the less the light flux, the greater the aperture value. The shallower the depth of field of the image acquisition component, the less the aperture value; and the deeper the depth of field, the greater the aperture value.

Shutter speed is a physical quantity related to exposure time. The faster the shutter speed, the shorter the exposure time; and the slower the shutter speed, the longer the exposure time. At the same time, the shutter value is inversely proportional to the shutter speed. The greater the shutter value, the slower the shutter speed; and the less the shutter value, the faster the shutter speed.

Sensitivity is the speed at which the photosensitive element responds to light. The higher the sensitivity value, the faster the speed at which the photosensitive element responds to light.

The focus information reflects the sharpness of the image of a focusing area. For example, the terminal determines whether the sharpness of the image of the focusing area is the highest according to the image information collected by the image acquisition component. If so, it's determined that the focusing is successful.

The exposure value corresponds to a combination of shooting parameters. The greater the exposure value, the combination of the shooting parameters is adjusted in a brighter direction of the photo; the less the exposure value, the combination of the shooting parameters is adjusted in a dimmer direction of the photo.

At block 905a, the terminal determines a display size of the component location information according to the shooting parameters.

The terminal adjusts the display size of the component location information according to the acquired parameters. For example, when the acquired parameters are within their normal ranges, the component location information is displayed in a normal size; when the acquired parameters are out of their normal ranges, the component location information is displayed in a first size bigger than the normal size or a second size smaller than the normal size.

Specifically, when the aperture value is less than a minimum value of a normal range of the aperture value, and the corresponding aperture is bigger, the component location information is displayed in a first size bigger than the normal size; when the aperture value is greater than a maximum value of the normal range of the aperture value, and the corresponding aperture is smaller, the component location information is displayed in a second size smaller than the normal size. When the shutter value is greater than a maximum value of a normal range of the shutter value, the component location information is displayed in a first size bigger than the normal size; when the shutter value is less than a minimum value of the normal range of the shutter value, the component location information is displayed in a second size smaller than the normal size. When the exposure value is greater than a maximum value of a normal range of the exposure value, the component location information is displayed in a first size bigger than the normal size; when the exposure value is less than a minimum value of the normal range of the exposure value, the component location information is displayed in a second size smaller than the normal size. When a focusing fails, the component location information is displayed in a second size smaller than the normal size; when the focusing is successful, the component location information is displayed in the normal size bigger than the second size. When the sensitivity value is greater than a maximum value of a normal range of the sensitivity value, the component location information is displayed in a first size bigger than the normal size; when the sensitivity value is less than a minimum value of the normal range of the sensitivity value, the component location information is displayed in a second size smaller than the normal size.

Figure 17:
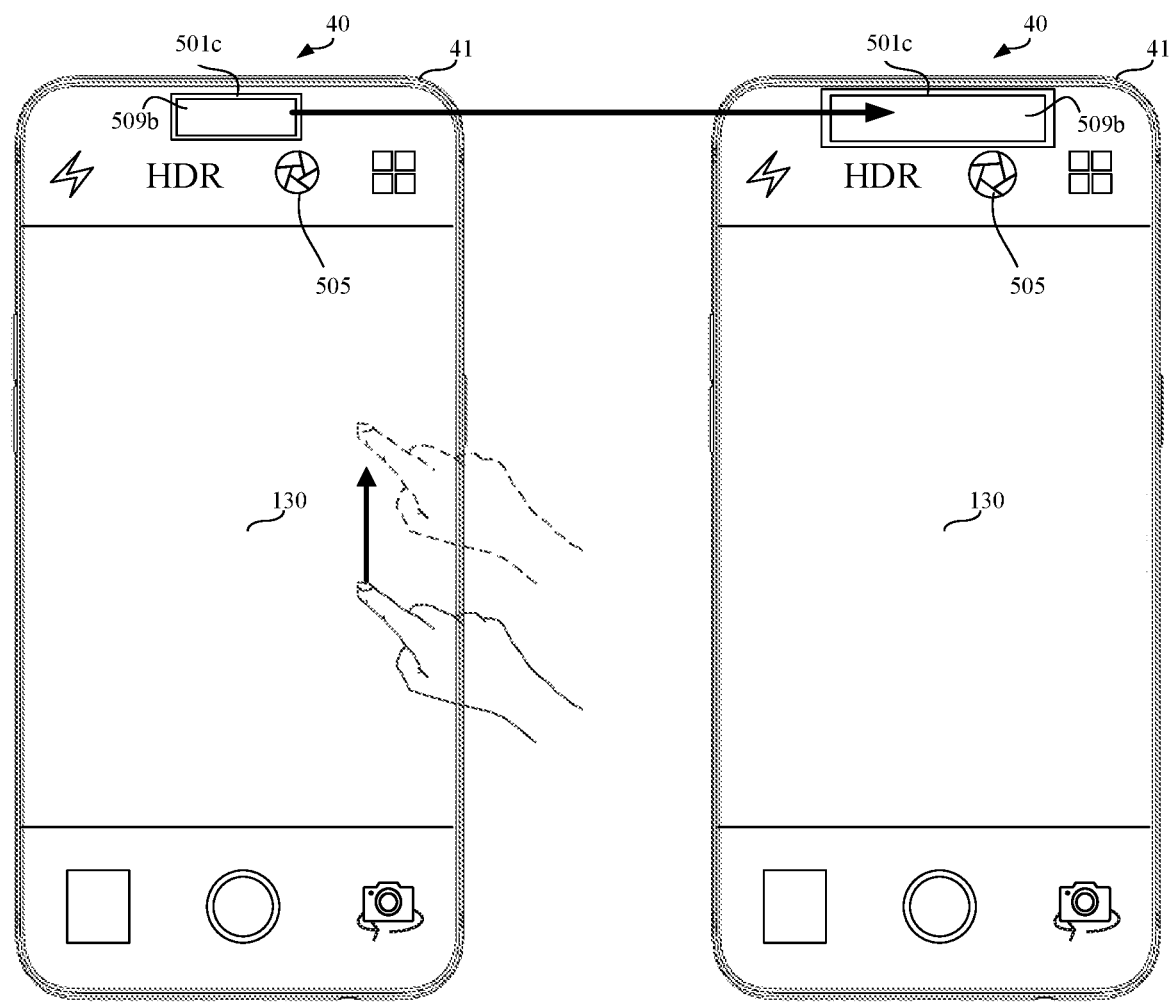
FIG. 17 is a schematic diagram of controlling shooting parameters according to another example implementation of the present disclosure.

FIG. 17 shows a schematic diagram of a method for controlling shooting parameters according to an implementation of the present disclosure. In the present implementation, the component location information is the contour mark 501c.

As illustrated in the left figure of FIG. 17, the user interface of the shooting application is displayed on the touch screen 130. The user interface contains the contour mark 501c and the shooting parameter mark 505.

Take the shooting parameter mark 505 being an aperture value mark as an example, when the user clicks the shooting parameter mark 505 to select the aperture value mark, the user can use a finger to slide on the touch screen 130, and the touch screen 130 generates a sliding signal according to the user's sliding operation. The sliding signal is a fifth operation signal. The touch screen 130 reports the fifth operation signal to the CPU in the terminal, and then the CPU adjusts the aperture value according to the fifth operation signal. If the aperture value becomes greater, as illustrated in the right figure of FIG. 17, the aperture icon corresponding to the aperture value mark 505 is displayed as a large aperture icon. At the same time, the contour mark 501c will also becomes bigger and its contour line will become thicker accordingly.

Similarly, when the shooting parameter selected by the user is the exposure value, the shutter value, or the sensitivity value, if a slide operation is performed on the touch screen 130, the touch screen 130 generates a slide signal according to the user's slide operation, and the slide signal is a sixth operation signal or a seventh operation signal. The touch screen 130 reports the third operation signal or the fourth operation signal to the CPU in the terminal, and the CPU adjusts the exposure value, the shutter value, or the sensitivity value according to the sixth operation signal or the seventh operation signal reported by the touch screen 130. The size and/or the thickness of the contour line of the contour mark 501c are also changed as the exposure value, the shutter value, or the sensitivity value changes.

Similarly, when the component location information is a location mark, the size of the location mark can also be changed by changing the shooting parameters.

It should be noted that the above determination of the size of the component location information according to the shooting parameters, and the selection of the shooting parameters by clicking the shooting parameter marks and then changing operating parameters by sliding operations are only example, and are not limited to this in practical applications.

Same as the action at block 605a, at block 905a, the shooting parameters can be controlled according to the user's operation. For example, after clicking to select a shooting parameter, the value of the shooting parameter can be changed by sliding. At the same time, the display size of the component location information changes with the change of the shooting parameter.

At block 905b, the terminal determines a display color of the component location information according to the shooting parameters.

The terminal adjusts the color of the component location information according to the acquired parameters.

Specifically, when the aperture value is less than a minimum value of a normal range of the aperture value, and the corresponding aperture is bigger, the component location information is displayed in a first color brighter than the normal color. When the aperture value is greater than a maximum value of the normal range of the aperture value, and the corresponding aperture is smaller, the component location information is displayed in a second color dimmer than the normal color. Since the light flux of the image acquisition component is greater when the aperture is bigger, so a brighter color is configured to remind the user that the aperture is bigger and the light flux is greater at this time. Correspondingly, since the light flux of the image acquisition component is less when the aperture is smaller, so a dimmer color is configured to remind the user that the aperture is smaller and the light flux is less at this time.

When the shutter value is greater than a maximum value of a normal range of the shutter value, the component location information is displayed in a second color dimmer than the normal color. When the shutter value is less than a minimum value of the normal range of the shutter value, the component location information is displayed in a first color brighter than the normal color. Since the shutter speed is slower when the shutter value is greater, and hand-held shooting may easily lead to unclear photos, so a dimmer color is configured to remind the user that the shutter speed is slower at this time and photos to be taken at this time are likely blurred. Since the shutter speed is faster when the shutter value is less, so a brighter color is configured to indicate that the shutter speed is faster at this time and it is safe to shoot.

When the exposure value is greater than a maximum value of a normal range of the exposure value, the component location information is displayed in a first color brighter than the normal color. When the exposure value is less than a minimum value of the normal range of the exposure value, the component location information is displayed in a second color dimmer than the normal color. Since the photos taken when the exposure value is greater are generally brighter, so a brighter color is configured to remind the user that the exposure value is greater at this time and photos to be taken at this time will be brighter. Correspondingly, since the photo taken when the exposure value is less are generally dimmer, so a dimmer color is configured to remind the user that the exposure value is less at this time and photos to be taken at this time will be dimmer.

When the focusing fails, the component location information is displayed in a second color dimmer than the normal color to remind the user that the focusing has not been successful and it is not suitable for shooting. When the focusing is successful, the component location information is displayed in the normal color brighter than the second color to remind the user that the focusing has been successful and it is suitable for shooting.

When the sensitivity value is greater than a maximum value of a normal range of the sensitivity value, the component location information is displayed in a second color dimmer than the normal color. When the sensitivity value is less than a minimum value of the normal range of the sensitivity value, the component location information is displayed in a first color brighter than the normal color. Since the photos taken when the sensitivity value is greater have more noise points, so a dimmer color is configured to remind the user that the sensitivity value is greater and image quality of photos to be taken will be poor. Correspondingly, since the photos taken when the sensitivity value is less have fewer noise points, so a brighter color is configured to remind the user that the sensitivity value is less and image quality of photos to be taken will be better.

In the above implementation, the color of the component location information may be different depending on the shooting parameters.

It should be noted that the above-mentioned determination of the display color of the component location information according to the shooting parameters is merely example, and is not limited to this in practical applications.

Same as the action at block 905a, at block 905b, the shooting parameters can be controlled according to the user's operation. For example, after clicking to select a shooting parameter, the value of the shooting parameter can be changed by sliding. At the same time, the display color of the component location information changes with the change of the shooting parameter.

At block 905c, the terminal determines a display shape of the component location information according to the shooting parameters.

The terminal adjusts the display shape of the component location information according to the acquired parameters. For example, when the acquired parameters are within their normal ranges, the contour lines of the component location information are displayed in normal solid lines; when the acquired parameters are out of their normal ranges, the contour lines of the component location information are displayed in dotted lines/thick solid lines.

Specifically, when the aperture value is less than a minimum value of a normal range of the aperture value, and the corresponding aperture is bigger, the contour lines of the component location information are displayed in dotted lines. When the aperture value is greater than a maximum value of the normal range of the aperture value, and the corresponding aperture is smaller, the contour lines of the component location information are displayed in thick solid lines. Since the photos taken when the aperture is bigger have shallower depth of field, so dotted lines representing blur are configured to remind the user that the aperture is bigger and the light flux is greater at this time. Correspondingly, since the photos taken when the aperture is smaller have deeper depth of field, so thick solid lines representing clear are configured to remind the user that the aperture is smaller and the light flux is less at this time.

When the shutter value is greater than a maximum value of a normal range of the shutter value, the contour lines of the component location information are displayed in dotted lines. When the shutter value is less than a minimum value of the normal range of the shutter value, the contour lines of the component location information are displayed in thick solid lines. Since the shutter speed is slower when the shutter value is greater, and hand-held shooting may easily lead to unclear photos, so dotted lines representing blur are configured to remind the user that the shutter speed is slower at this time and photos to be taken at this time are likely blurred. Since the shutter speed is faster when the shutter value is less, so thick solid lines representing clear are configured to indicate that the shutter speed is faster at this time and it is safe to shoot.

When the exposure value is greater than a maximum value of a normal range of the exposure value, the contour lines of the component location information are displayed in thick solid lines. When the exposure value is less than a minimum value of the normal range of the exposure value, the contour lines of the component location information are displayed in dotted lines. Since the photos taken when the exposure value is greater are brighter, so thick solid lines representing clear are configured to remind the user that the exposure value is greater at this time and photos to be taken will be brighter. Correspondingly, since the photo taken when the exposure value is less are dimmer, so dotted lines representing blur are configured to remind the user that the exposure value is less at this time and photos to be taken at this time will be dimmer.

When the sensitivity value is greater than a maximum value of a normal range of the sensitivity value, the contour lines of the component location information are displayed in dotted lines. When the sensitivity value is less than a minimum value of the normal range of the sensitivity value, the contour lines of the component location information are displayed in thick solid lines. Since the photos taken when the sensitivity value is greater have more noise points, so dotted lines representing blur are configured to remind the user that the sensitivity value is greater and image quality of photos to be taken will be poor. Correspondingly, since the photos taken when the sensitivity value is less have fewer noise points, so thick solid lines representing clear are configured to remind the user that the sensitivity value is less and image quality of photos to be taken will be better.

When the focusing fails, the contour lines of the component location information are displayed in dotted lines to remind the user that the focusing has not been successful and it is not suitable for shooting. When the focusing is successful, the contour lines of the component location information are displayed in normal solid lines to remind the user that the focusing has been successful and it is suitable for shooting.

In the above implementation, when the shooting parameters are different, the shape of the component location information may be different.

It should be noted that the above-mentioned determination of the display shape of the component location information according to the shooting parameters is merely example, and is not limited to this in practical applications.

Same as the action at block 905*a*, at block 905*c*, the shooting parameters can be controlled according to the user's operation. For example, after clicking to select a shooting parameter, the value of the shooting parameter can be changed by sliding. At the same time, the display shape of the component location information changes with the change of the shooting parameter.

At block 905*d*, the terminal determines a display animation of the component location information according to the shooting parameters.

The terminal adjusts the display animation of the component location information according to the acquired parameters.

For example, when the aperture value is less than a fourth threshold value, and the corresponding aperture is bigger, the display animation of the component location information has a constant brightness. When the aperture value is greater than the fourth threshold value, and the corresponding aperture is smaller, the display animation of the component location information is a gradient animation having a brightness changed from bright to dim and then from dim to bright. Since the light flux of the image acquisition component is greater when the aperture is bigger, so a component location information having a constant brightness is configured to remind the user that the aperture is bigger and the light flux is greater at this time, and photos to be taken will be normal. Correspondingly, since the light flux of the image acquisition component is less when the aperture is smaller, so a gradient animation having breathing effects that a brightness is changed from bright to dim and then from dim to bright, is configured to remind the user that the aperture is smaller and the light flux is less at this time, and photos to be taken will be dim or fuzzy.

When the shutter value is greater than a first threshold value and its corresponding shutter speed is slower, the display animation of the component location information is a gradient animation having a brightness changed from bright to dim and then from dim to bright. When the shutter value is less than the first threshold value and its corresponding shutter speed is faster, the display animation of the component location information has a constant brightness. Since the photos taken when the shutter speed is slower tend to be blurred, so a gradient animation having breathing effects that a brightness is changed from bright to dim and then from dim to bright, is configured to remind the user that the shutter speed is slower at this time and photos to be taken at this time are likely blurred. Since the shutter speed is faster when the shutter value is less, so a component location information having a constant brightness is configured to remind the user that the shutter speed is faster at this time and it is safe to shoot.

When the exposure value is greater than a second threshold value, or when the exposure value is less than a third threshold value, the display animation of the component location information is a gradient animation having a brightness changed from bright to dim and then from dim to bright, where the third threshold value is less than the second threshold value. Since it is overexposed when the exposure value is greater than the second threshold value, and it is underexposed when the exposure value is less than the third threshold value, so a gradient animation having breathing effects that a brightness is changed from bright to dim and then from dim to bright, is configured to remind the user that it is overexposed or underexposed. When the exposure value is between the third threshold value and the second threshold value, the display animation of the component location information has a constant brightness, which reminds the user that the exposure is normal.

When the focusing fails, the display animation of the component location information has a constant brightness, which reminds the user that the focusing has not been successful and it is not suitable for shooting. When the focus information indicates that the focusing is successful, the display animation of the component location information is a flashing display, which reminds the user that it is suitable for shooting.

When the sensitivity value is greater than a fifth threshold value, the display animation of the component location information is a gradient animation having a brightness changed from bright to dim and then from dim to bright. When the sensitivity value is less than the fifth threshold value, the display animation of the component location information has a constant brightness. Since the photos taken when the sensitivity value is greater have more noise points, so a gradient animation having breathing effects that a brightness is changed from bright to dim and then from dim to bright, is configured to remind the user that the sensitivity value is greater and image quality of photos to be taken will be poor. Correspondingly, since the photos taken when the sensitivity value is less have fewer noise points, so a component location information having a constant brightness is configured to remind the user that the sensitivity value is less and image quality of photos to be taken will be better.

It should be noted that the above-mentioned determination of the display animation of the component location information according to the shooting parameters is merely example, and is not limited to this in practical applications.

Same as the action at block 905*a*, at block 905*d*, the shooting parameters can be controlled according to the user's operation. For example, after clicking to select a shooting parameter, the value of the shooting parameter can be changed by sliding. At the same time, the display animation of the component location information changes with the change of the shooting parameter.

It should be noted that the actions at block 905*a*, 905*b*, 905*c*, and 905*d* may be performed in series, or only the action at block 905*a*, 905*b*, 905*c*, or 905*d* be performed.

In summary, in the method for displaying a shooting interface provided in the implementation, the second shooting interface is displayed on the touch screen of the terminal, where the second shooting interface is provided with the component location information, and the component location information is the prompt information configured to indicate the edge contour of the image acquisition component, which solves the problem that the user cannot easily identify the location of the image acquisition component when the terminal is in the front shooting mode because the image acquisition component and the touch screen are integrated into one body on vision when the image acquisition component is integrated into the touch screen of the terminal, and enables the user to clearly determine the location of the image acquisition component according to the component location information displayed on the shooting interface when using the image acquisition component of the terminal in which the image acquisition component is integrated into the touch screen, thereby facilitating the user to use the image acquisition component to aim at a target object for shooting when the terminal is in the front shooting mode.

Further, in the method for displaying a shooting interface provided in the implementation, by determining at least one of the display size, the display color, the display shape, and the display animation of the component location information is determined according to the shooting parameters, the user can intuitively know the influence of the shooting parameters on the shooting effect through at least one of the display size, the display color, the display shape, and the display animation of the component location information, which is convenient for the user to adjust the shooting parameters according to at least one of the prompts including the display size, the display color, the display shape, and the display animation of the component location information.

An implementation of the present disclosure further provides a device for displaying a shooting interface. The device is applied to a terminal in which an image acquisition component is integrated into a touch screen of the terminal. The device includes the followings. A receiving module is configured to receive a first operation signal, where the first operation signal is a signal configured to enable the image acquisition component to perform shooting. A control module is configured to enable the image acquisition component according to the first operation signal. A display module is configured to display a shooting interface on the touch screen, where the shooting interface is provided with a component location information which is a prompt information configured to indicate a location of the image acquisition component.

The following is a device implementation according to an implementation of the present disclosure. For technical details that are not described in detail in the device implementation, references may be made to the technical details disclosed in the foregoing method implementations.

Figure 20:
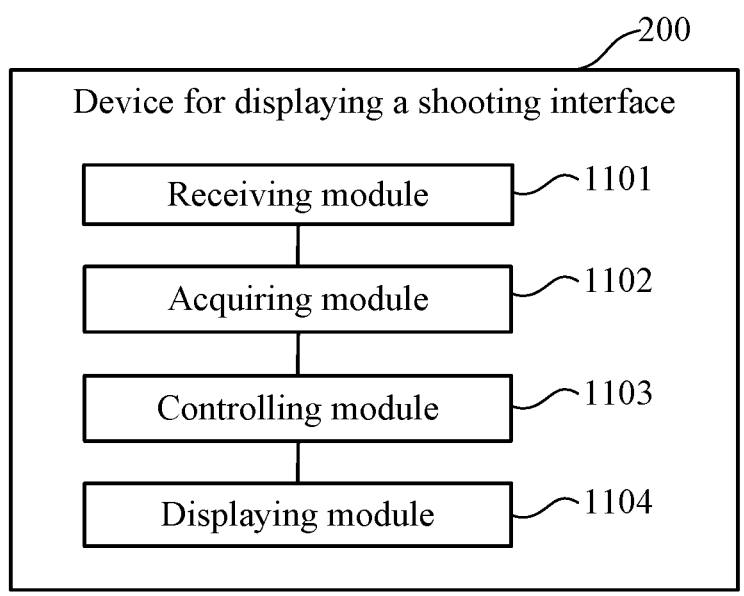
FIG. 20 is a structural diagram of a device for displaying a shooting interface according to an example implementation of the present disclosure.

FIG. 20 is a structural diagram of a device 200 for displaying a shooting interface according to an example implementation of the present disclosure. The device for displaying a shooting interface can be implemented as all or part of a terminal through software, hardware, or a combination of software and hardware. The device 200 for displaying a shooting interface is applied to a terminal with a full-screen design. The device 200 for displaying a shooting interface includes a receiving module 1101, an acquiring module 1102, a control module 1103, and a display module 1104.

The receiving module 1101 is configured to implement the foregoing actions at blocks 401, 601, 901, and receiving-related functions implied in each action.

The obtaining module 1102 is configured to implement the foregoing actions at blocks 604, 904, and obtaining-related functions implied in each action.

The control module 1103 is configured to implement the foregoing actions at blocks 402, 602, 605a, 605b, 605c, 605d, 902, 905a, 905b, 905c, 905d, and the control-related functions implied in each action.

The display module 1104 is configured to implement the foregoing actions at blocks 403, 603a, 603b, 903a, 903b, and the display-related functions implied in and each action.

In summary, in the device for displaying a shooting interface provided in the implementation, the shooting interface is displayed on the touch screen of the terminal, where the shooting interface is provided with the component location information, and the component location information is the prompt information configured to indicate the location of the image acquisition component, which solves the problem that the user cannot easily identify the location of the image acquisition component when the terminal is in the front shooting mode because the image acquisition component and the touch screen are integrated into one body on vision when the image acquisition component is integrated into the touch screen of the terminal, and enables the user to clearly determine the location of the image acquisition component according to the component location information displayed on the shooting interface when using the image acquisition component of the terminal in which the image acquisition component is integrated into the touch screen, thereby facilitating the user to use the image acquisition component to aim at a target object for shooting when the terminal is in the front shooting mode.

Further, in the method for displaying a shooting interface provided in the implementation, by determining at least one of the display size, the display color, the display shape, and the display animation of the component location information is determined according to the shooting parameters, the user can intuitively know the influence of the shooting parameters on the shooting effect through at least one of the display size, the display color, the display shape, and the display animation of the component location information, which is convenient for the user to adjust the shooting parameters according to at least one of the prompts including the display size, the display color, the display shape, and the display animation of the component location information.

An implementation of the present disclosure further provides a terminal. The terminal includes a processor and a memory. The memory stores at least one instruction, and the instruction is configured to be loaded and executed by the processor to implement the method for displaying a shooting interface described in the foregoing implementations.

Specifically, the terminal further includes an image acquisition component and a touch screen, where the image acquisition component is integrated into the touch screen.

When executed by the processor, the instructions cause the processor to receive a first operation signal, where the first operation signal is a signal configured to enable the image acquisition component to perform shooting; enable the image acquisition component according to the first operation signal; and display a shooting interface on the touch screen, where the shooting interface is provided with a component location information which is a prompt information configured to indicate a location of the image acquisition component.

It should be noted that, for technical details that are not described in detail in this implementations, references may be made to the method for displaying a shooting interface provided by any foregoing method implementation of the present disclosure.

An implementation of the present disclosure further provides a non-transitory computer-readable storage medium on which at least one instruction is stored. The at least one instruction is configured to be loaded and executed by a processor to implement the method for displaying a shooting interface described in the foregoing implementations.

An implementation of the present disclosure further provides a computer program product. The computer program product stores at least one instruction, and the at least one instruction is configured to be loaded and executed by a processor to implement the method for displaying a shooting interface described in the foregoing implementations.

Those skilled in the art should be aware that in one or more of the above implementations, the functions described in the implementations of the present disclosure may be implemented by hardware, software, firmware, or any combination thereof. When implemented in software, these functions may be stored in a computer-readable medium or transmitted as one or more instructions or codes on a computer-readable medium. The computer-readable media includes a computer storage media and a communication media, where the communication media includes any medium that facilitates transfer of a computer program from one place to another. The storage media may be any available media that can be accessed by a general purpose or special purpose computer.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for displaying a shooting interface, applied to a terminal in which an image acquisition component is integrated into a touch screen of the terminal, and the method comprising:
   receiving a first operation signal, wherein the first operation signal is a signal configured to enable the image acquisition component to perform shooting;
   enabling the image acquisition component according to the first operation signal;
   displaying a shooting interface on the touch screen, wherein the shooting interface is provided with a component location information that is a prompt information configured to indicate a location of the image acquisition component;
   acquiring shooting parameters, wherein the shooting parameters comprise at least one of an aperture value, a shutter value, an exposure value, a focus information, or a sensitivity value; and
   determining a brightness of a display animation of the component location information according to the shooting parameters, comprising:
      determining that the display animation of the component location information is a gradient animation having a brightness changed from bright to dim and then from dim to bright when a first preset condition is satisfied; and
      determining that the display animation of the component location information has a constant brightness when a second preset condition is satisfied;

wherein the first preset condition comprises one of:
- the shutter value is greater than a first threshold value;
- the exposure value is greater than a second threshold value or less than a third threshold value;
- the aperture value is greater than a fourth threshold value; or
- the sensitivity value is greater than a fifth threshold value;

wherein the second preset condition comprises one of:
- the shutter value is less than the first threshold value;
- the exposure value is less than the second threshold value and greater than the third threshold value;
- the aperture value is less than the fourth threshold value; or
- the sensitivity value is less than the fifth threshold value.

2. The method of claim 1, wherein the touch screen is provided with a hole, and the image acquisition component is arranged in the hole; the component location information is a contour mark; and
- wherein displaying the shooting interface on the touch screen, the shooting interface being provided with the component location information comprises:
  - displaying a first shooting interface on the touch screen, the first shooting interface being provided with the contour mark, wherein the contour mark is displayed around an edge contour of the hole.

3. The method of claim 1, wherein the touch screen is provided with a hole, and the image acquisition component is arranged in the hole; the component location information is a location mark; and
- wherein displaying the shooting interface on the touch screen, the shooting interface being provided with the component location information comprises:
  - displaying a first shooting interface on the touch screen, the first shooting interface being provided with the location mark, wherein the location mark is located at the periphery of a location of the hole and points to the location of the hole.

4. The method of claim 1, wherein photosensitive pixels of the image acquisition component are dispersedly integrated in display pixels in a predetermined area of the touch screen; the component location information is a contour mark; and
- wherein displaying the shooting interface on the touch screen, the shooting interface being provided with the component location information comprises:
  - displaying a second shooting interface on the touch screen, the second shooting interface being provided with the contour mark, wherein the contour mark is displayed around an edge contour of the predetermined area.

5. The method of claim 1, wherein photosensitive pixels of the image acquisition component are dispersedly integrated in display pixels in a predetermined area of the touch screen; the component location information is a location mark; and
- wherein displaying the shooting interface on the touch screen, the shooting interface being provided with the component location information comprises:
  - displaying a second shooting interface on the touch screen, the second shooting interface being provided with the location mark, wherein the location mark is located at the periphery of the predetermined area and points to the location of the predetermined area.

6. The method of claim 1, wherein determining the brightness of the display animation of the component location information according to the shooting parameters further comprises:
- determining that the display animation of the component location information has a constant brightness, when the focus information indicates that the focusing fails; and
- determining that the display animation of the component location information is a flashing display, when the focus information indicates that the focusing is successful.

7. The method of claim 1, wherein the shooting parameters comprise the aperture value;
- wherein when the aperture value is within its normal range, the method further comprises at least one of the following actions:
  - displaying the component location information in a normal size;
  - displaying the component location information in a normal color; or
  - displaying contour lines of the component location information in normal solid lines;
- wherein when the aperture value is less than a minimum value of the normal range of the aperture value, the method further comprises at least one of the following actions:
  - displaying the component location information in a first size bigger than the normal size;
  - displaying the component location information in a first color brighter than the normal color; or
  - displaying the contour lines of the component location information in dotted lines; and
- wherein when the aperture value is greater than a maximum value of the normal range of the aperture value, the method further comprises at least one of the following actions:
  - displaying the component location information in a second size smaller than the normal size;
  - displaying the component location information in a second color dimmer than the normal color; or
  - displaying the contour lines of the component location information in thick solid lines.

8. The method of claim 1, wherein the shooting parameters comprise the shutter value;
- wherein when the shutter value is within its normal range, the method further comprises at least one of the following actions:
  - displaying the component location information in a normal size;
  - displaying the component location information in a normal color; or
  - displaying contour lines of the component location information in normal solid lines;
- wherein when the shutter value is greater than a maximum value of a normal range of the shutter value, the method further comprises at least one of the following actions:
  - displaying the component location information in a first size bigger than the normal size;
  - displaying the component location information in a second color dimmer than the normal color; or
  - displaying the contour lines of the component location information in dotted lines; and
- wherein when the shutter value is less than a minimum value of a normal range of the shutter value, the method further comprises at least one of the following actions:

displaying the component location information in a second size smaller than the normal size;
displaying the component location information in a first color brighter than the normal color; or
displaying the contour lines of the component location information in thick solid lines.

9. The method of claim 1, wherein the shooting parameters comprise the exposure value;
wherein when the exposure value is within its normal range, the method further comprises at least one of the following actions:
displaying the component location information in a normal size;
displaying the component location information in a normal color; or
displaying contour lines of the component location information in normal solid lines;
wherein when the exposure value is greater than a maximum value of a normal range of the exposure value, the method further comprises at least one of the following actions:
displaying the component location information in a first size bigger than the normal size;
displaying the component location information in a first color brighter than the normal color; or
displaying the contour lines of the component location information in thick solid lines; and
wherein when the exposure value is less than a minimum value of the normal range of the exposure value, the method further comprises at least one of the following actions:
displaying the component location information in a second size smaller than the normal size;
displaying the component location information in a second color dimmer than the normal color; or
displaying the contour lines of the component location information in dotted lines.

10. The method of claim 1, wherein the shooting parameters comprise the sensitivity value;
wherein when the sensitivity value is within its normal range, the method further comprises at least one of the following actions:
displaying the component location information in a normal size;
displaying the component location information in a normal color; or
displaying contour lines of the component location information in normal solid lines;
wherein when the sensitivity value is greater than a maximum value of the normal range of the sensitivity value, the method further comprises at least one of the following actions:
displaying the component location information in a first size bigger than the normal size;
displaying the component location information in a second color dimmer than the normal color; or
displaying the contour lines of the component location information in dotted lines; and
wherein when the sensitivity value is less than a minimum value of the normal range of the sensitivity value, the method further comprises at least one of the following actions:
displaying the component location information in a second size smaller than the normal size;
displaying the component location information in a first color brighter than the normal color; or
displaying the contour lines of the component location information in thick solid lines.

11. The method of claim 1, wherein the shooting parameters comprise the focus information;
wherein when the focus information indicates that the focusing fails, the method further comprises at least one of the following actions:
displaying the component location information in a size smaller than a normal size;
displaying the component location information in a color dimmer than a normal color; or
displaying contour lines of the component location information in dotted lines; and
wherein when the focus information indicates that the focusing is successful, the method further comprises at least one of the following actions:
displaying the component location information in the normal size;
displaying the component location information in the normal color; or
displaying contour lines of the component location information in normal solid lines.

12. A terminal comprising:
a touch screen;
an image acquisition component integrated into the touch screen;
a processor; and
a memory configured to store at least one instruction;
the at least one instruction, when executed by the processor, causing the processor to:
receive a first operation signal, wherein the first operation signal is a signal configured to enable the image acquisition component to perform shooting;
enable the image acquisition component according to the first operation signal;
display a shooting interface on the touch screen, wherein the shooting interface is provided with a component location information that is a prompt information configured to indicate a location of the image acquisition component;
acquire one or more shooting parameters, wherein the one or more shooting parameters comprise an aperture value; and
determine at least one of a display size, a display color, a display shape, or a brightness of a display animation of the component location information according to the one or more shooting parameters,
wherein when the aperture value is within its normal range, the processor is further caused to perform at least one of:
display the component location information in a normal size;
display the component location information in a normal color; or
display contour lines of the component location information in normal solid lines;
wherein when the aperture value is less than a minimum value of the normal range of the aperture value, the processor is further caused to perform at least one of:
display the component location information in a first size bigger than the normal size;
display the component location information in a first color brighter than the normal color; or
display the contour lines of the component location information in dotted lines; and wherein when the aperture value is greater than a maximum value of the normal range of the aperture value, the processor is further caused to perform at least one of:
- display the component location information in a second size smaller than the normal size;
- display the component location information in a second color dimmer than the normal color; or
- display the contour lines of the component location information in thick solid lines.

13. The terminal of claim 12, wherein the touch screen is provided with a hole, and the image acquisition component is arranged in the hole;
wherein the component location information is a contour mark that is displayed around an edge contour of the hole; or
the component location information is a location mark that is located at the periphery of a location of the hole and points to the location of the hole.

14. The terminal of claim 12, wherein photosensitive pixels of the image acquisition component are dispersedly integrated in display pixels in a predetermined area of the touch screen;
wherein the component location information is a contour mark that is displayed around an edge contour of the predetermined area; or
the component location information is a location mark that is located at the periphery of the predetermined area and points to the location of the predetermined area.

15. A non-transitory computer-readable storage medium storing at least one instruction that, when executed by a processor, cause the processor to:
- receive a first operation signal, wherein the first operation signal is a signal configured to enable an image acquisition component to perform shooting, wherein the image acquisition component is integrated into a touch screen of a terminal;
- enable the image acquisition component according to the first operation signal;
- display a shooting interface on the touch screen, wherein the shooting interface is provided with a component location information that is a prompt information configured to indicate a location of the image acquisition component;
- acquire one or more shooting parameters, wherein the one or more shooting parameters comprise a shutter value; and
- determine at least one of a display size, a display color, a display shape, or a brightness of a display animation of the component location information according to the one or more shooting parameters,
wherein when the shutter value is within its normal range, the processor is further caused to perform at least one of:
- display the component location information in a normal size;
- display the component location information in a normal color; or
- display contour lines of the component location information in normal solid lines;

wherein when the shutter value is greater than a maximum value of a normal range of the shutter value, the processor is further caused to perform at least one of:
- display the component location information in a first size bigger than the normal size;
- display the component location information in a second color dimmer than the normal color; or
- display the contour lines of the component location information in dotted lines; and wherein when the shutter value is less than a minimum value of a normal range of the shutter value, the processor is further caused to perform at least one of:
- display the component location information in a second size smaller than the normal size;
- display the component location information in a first color brighter than the normal color; or
- display the contour lines of the component location information in thick solid lines.

16. The non-transitory computer-readable storage medium of claim 15, wherein the component location information is a contour mark that is displayed around an edge contour of the location of the image acquisition component; or
the component location information is a location mark that is located at the periphery of a location of the image acquisition component and points to the location of the image acquisition component.

17. The non-transitory computer-readable storage medium of claim 15, wherein the one or more shooting parameters further comprise an exposure value;
wherein when the exposure value is within its normal range, the processor is further caused to perform at least one of:
- display the component location information in a normal size;
- display the component location information in a normal color; or
- display contour lines of the component location information in normal solid lines;

wherein when the exposure value is greater than a maximum value of a normal range of the exposure value, the processor is further caused to perform at least one of:
- display the component location information in a first size bigger than the normal size;
- display the component location information in a first color brighter than the normal color; or
- display the contour lines of the component location information in thick solid lines; and wherein when the exposure value is less than a minimum value of the normal range of the exposure value, the processor is further caused to perform at least one of:
- display the component location information in a second size smaller than the normal size;
- display the component location information in a second color dimmer than the normal color; or
- display the contour lines of the component location information in dotted lines.

* * * * *